United States Patent
Griffing et al.

(10) Patent No.: US 10,901,109 B2
(45) Date of Patent: Jan. 26, 2021

(54) DETECTION AND AVOIDANCE OF DOWNHOLE NOISE AND INTERFERENCE SOURCES

(71) Applicant: Halliburton Energy Services, Inc., Houston, TX (US)

(72) Inventors: Matthew Chase Griffing, Houston, TX (US); Faisal Farooq Shah, Houston, TX (US); Chris Gao, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 387 days.

(21) Appl. No.: 15/759,766

(22) PCT Filed: Dec. 15, 2015

(86) PCT No.: PCT/US2015/065662
§ 371 (c)(1),
(2) Date: Mar. 13, 2018

(87) PCT Pub. No.: WO2017/105398
PCT Pub. Date: Jun. 22, 2017

(65) Prior Publication Data
US 2019/0049614 A1    Feb. 14, 2019

(51) Int. Cl.
| | | |
|---|---|---|
| *G01V 3/20* | (2006.01) | |
| *G01V 3/18* | (2006.01) | |
| *E21B 47/12* | (2012.01) | |
| *E21B 49/08* | (2006.01) | |
| *G01V 3/38* | (2006.01) | |

(52) U.S. Cl.
CPC ............... *G01V 3/20* (2013.01); *E21B 47/12* (2013.01); *E21B 49/08* (2013.01); *G01V 3/18* (2013.01); *G01V 3/38* (2013.01)

(58) Field of Classification Search
CPC ........... E21B 47/12; E21B 49/08; G01V 3/20; G01V 3/38; G01V 3/18
See application file for complete search history.

(56) References Cited

U.S. PATENT DOCUMENTS

| | | | |
|---|---|---|---|
| 6,766,854 B2 * | 7/2004 | Ciglenec | E21B 49/00 166/250.11 |
| 2007/0084636 A1 | 4/2007 | Royle | |
| 2015/0130627 A1 | 5/2015 | Morrison et al. | |

OTHER PUBLICATIONS

Tarczynski et al., 'Spectrum Estimation of Non-Uniformly Sampled Signals', 1996, IEEE Publication, pp. 196-200 (Year: 1996).*

(Continued)

*Primary Examiner* — Elias Desta
(74) *Attorney, Agent, or Firm* — Gilliam IP PLLC

(57) ABSTRACT

In some embodiments, an apparatus and a system, as well as methods, include sampling a received signal that represents a downhole signal source, at a sampling frequency and for a sampling duration, to provide a sampled signal. Further activity may comprise detecting a frequency of a component of the sampled signal from inspection of a frequency domain representation of the sampled signal. Further activity may comprise adjusting at least one operating frequency for the downhole tool such that the at least one operating frequency is outside a frequency range from the frequency of the component of the sampled signal. Additional methods, apparatus, and systems are disclosed.

19 Claims, 14 Drawing Sheets

(56) References Cited

OTHER PUBLICATIONS

"International Application Serial No. PCT/US2015/065662, International Search Report dated Aug. 19, 2016", 3 pages.
"International Application Serial No. PCT/US2015/065662, Written Opinion dated Aug. 19, 2016", 12 pages.

\* cited by examiner

HF - High Frequency
LOF - Local Oscilator Frequency
LF - Low Frequency

DETECTION AND AVOIDANCE OF DOWNHOLE NOISE AND INTERFERENCE SOURCES

BACKGROUND

Understanding the structure and properties of geological formations may reduce the cost of drilling wells for oil and gas exploration. Measurements are typically performed in a borehole (i.e., down hole measurements) in order to attain this understanding. For example, the measurements may identify the composition and distribution of material that surrounds the measurement device down hole. To obtain such measurements, a variety of sensors and mounting configurations may be used.

Measurement apparatus that make use of these sensors and mounting configurations include tools that are used to determine formation resistivity. These tools can sometimes be operated over a range of frequencies.

However, downhole signals, such as noise or interference sources, may interfere with tool signals in at least some portion of this range of frequencies.

DETAILED DESCRIPTION

To address some of the challenges described above, as well as others, apparatuses and systems described herein can adjust operating frequencies and output power of downhole tools according to methods described herein to avoid or mitigate the effects of noise or interference sources. In embodiments, these apparatuses, systems, and methods can adjust operating frequencies and output power of downhole tools before each use of the corresponding downhole tool, between each measurement by the corresponding downhole tool, or according to any schedule or periodicity as indicated by downhole conditions or other criteria.

Figure 1:
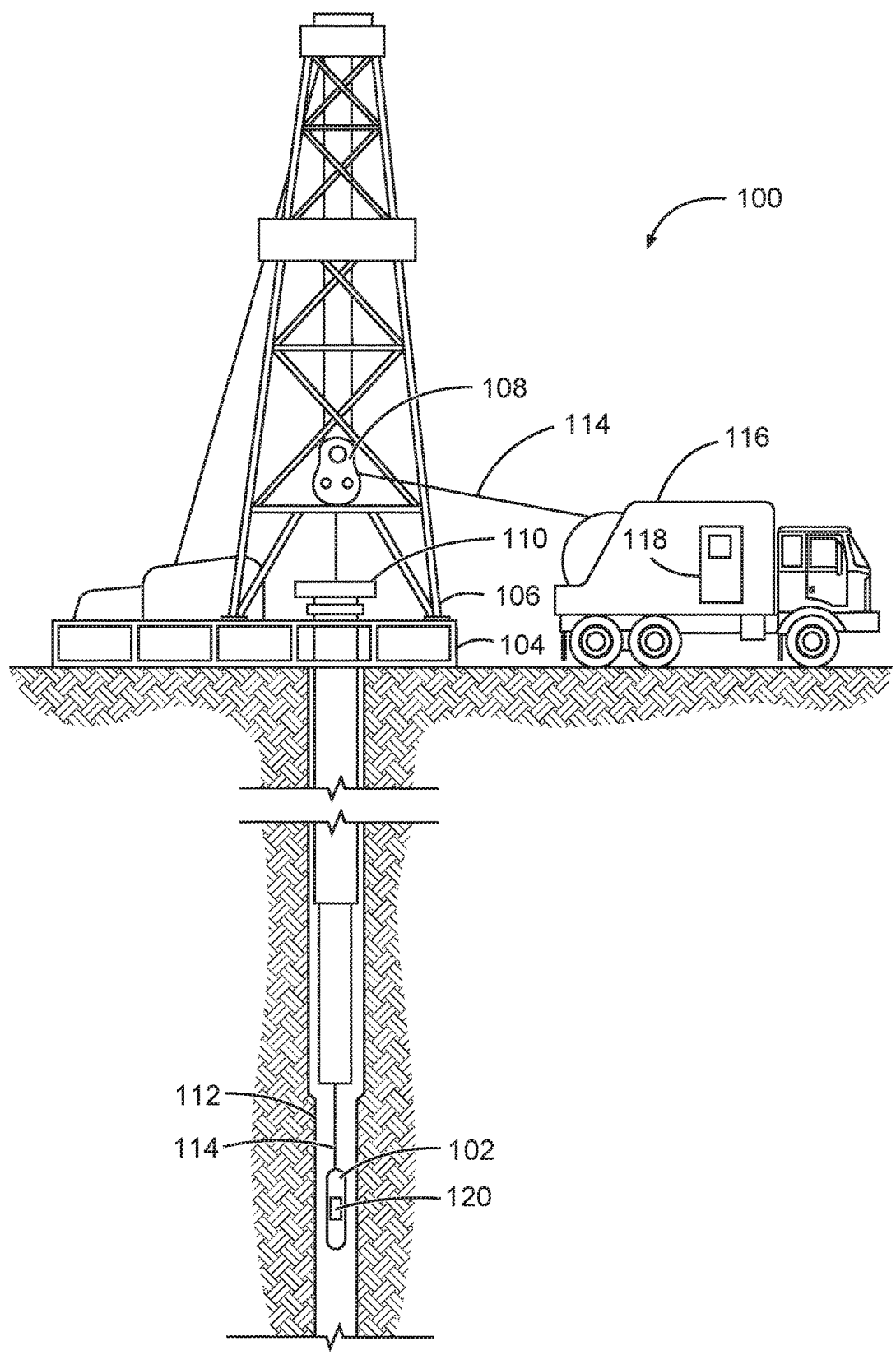
FIG. 1 depicts an example wireline system, according to various embodiments.
Figure 2:
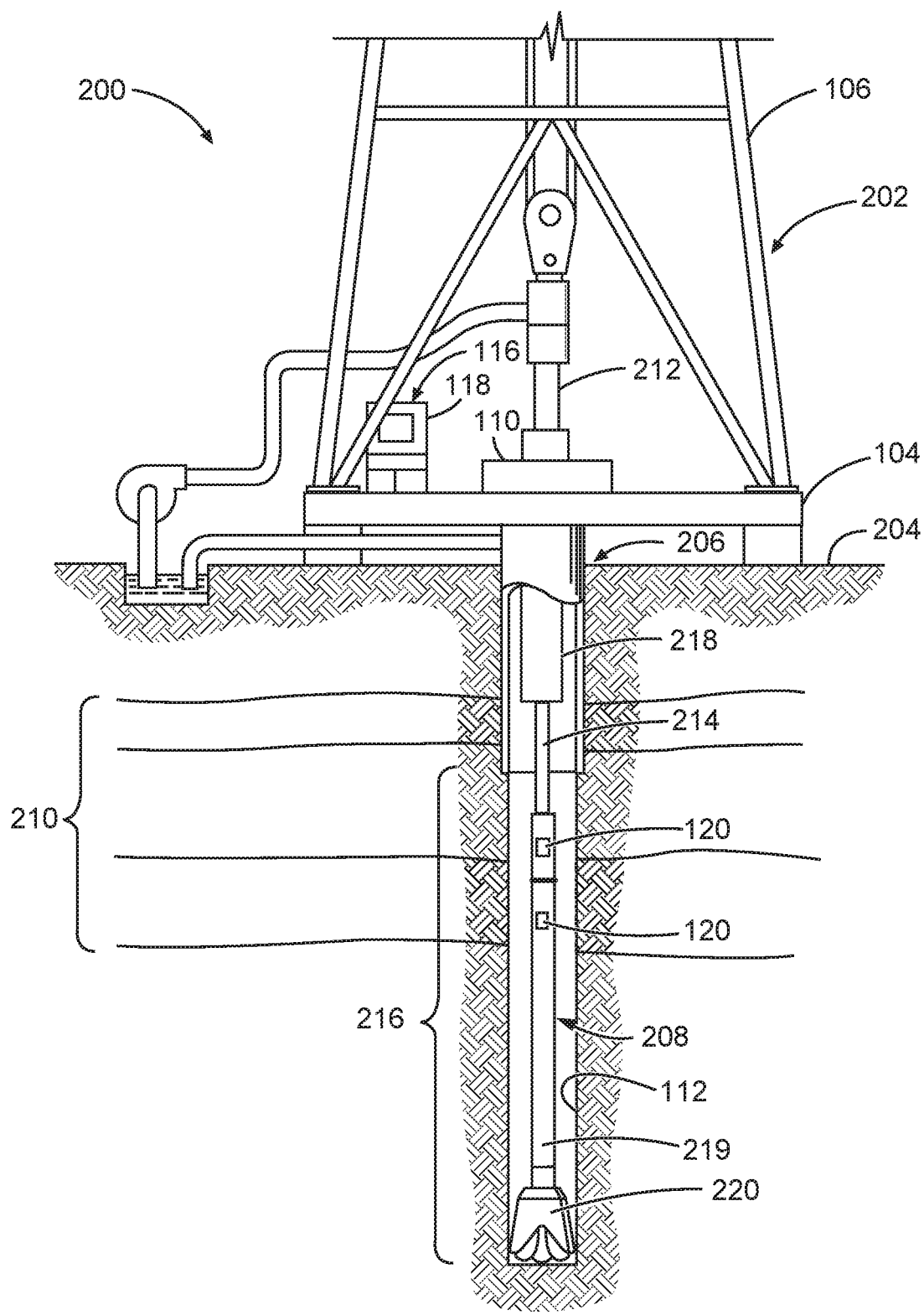
FIG. 2 depicts an example drilling rig system, according to various embodiments.

FIG. 1 depicts an example wireline system 100 according to various embodiments, and FIG. 2 depicts an example drilling rig system 200 according to various embodiments. Thus, the systems 100, 200 may comprise portions of a wireline logging tool body 102 as part of a wireline logging operation, or of a downhole tool 219 as part of a downhole drilling operation. Thus, FIG. 1 shows a well during wireline logging operations. In this case, a drilling platform 104 is equipped with a derrick 106 that supports a hoist 108.

Drilling oil and gas wells is commonly carried out using a string of drill pipes connected together so as to form a drilling string that is lowered through a rotary table 110 into a wellbore or borehole 112. Here it is assumed that the drilling string has been temporarily removed from the borehole 112 to allow a wireline logging tool body 102, such as a probe or sonde, to be lowered by wireline or logging cable 114 into the borehole 112. Typically, the wireline logging tool body 102 is lowered to the bottom of the region of interest and subsequently pulled upward at a substantially constant speed.

During the upward trip, at a series of depths the instruments (e.g., the downhole receiver 300 shown in FIG. 3, resistivity tool 1905 shown in FIG. 19, etc.) included in the tool body 102 may be used to perform measurements on the subsurface geological formations adjacent the borehole 112 (and the tool body 102). The measurement data can be communicated to a surface logging facility 116 for storage, processing, and analysis. The logging facility 116 may be provided with electronic equipment for various types of signal processing. Similar formation evaluation data may be gathered and analyzed during drilling operations (e.g., during LWD operations, and by extension, sampling while drilling).

In some embodiments, the tool body 102 comprises a resistivity measurement tool 120 for obtaining and analyzing resistivity measurements in a subterranean formation through a borehole 112, although embodiments are not limited to resistivity measurement tools. The tool is suspended in the wellbore by a wireline cable 114 that connects the tool to a surface control unit (e.g., comprising a workstation 118). The tool may be deployed in the borehole 112 on coiled tubing, jointed drill pipe, hard wired drill pipe, or any other suitable deployment technique.

Turning now to FIG. 2, it can be seen how a system 200 may also form a portion of a drilling rig 202 located at the surface 204 of a well 206. The drilling rig 202 may provide support for a drill string 208. The drill string 208 may operate to penetrate the rotary table 110 for drilling the borehole 112 through the subsurface formations 210. The drill string 208 may include a Kelly 212, drill pipe 214, and a bottom hole assembly 216, perhaps located at the lower portion of the drill pipe 214.

The bottom hole assembly 216 may include drill collars 218, a downhole tool 219, and a drill bit 220. The drill bit 220 may operate to create the borehole 112 by penetrating the surface 204 and the subsurface formations 210. The downhole tool 219 may comprise any of a number of different types of tools including MWD tools, LWD tools, and others. In embodiments, the downhole tool 219 includes a resistivity tool. In embodiments, the resistivity tool is a very deep resistivity (VDR) tool, which can be roughly defined as having a depth of investigation/penetration of greater than 25 ft out to about 100 ft, while conventional resistivity tools have a much shallower depth of investigation, typically less than 25 ft.

During drilling operations, the drill string 208 (perhaps including the Kelly 212, the drill pipe 214, and the bottom hole assembly 216) may be rotated by the rotary table 110. Although not shown, in addition to, or alternatively, the bottom hole assembly 216 may also be rotated by a motor (e.g., a mud motor) that is located downhole. The drill collars 218 may be used to add weight to the drill bit 220. The drill collars 218 may also operate to stiffen the bottom hole assembly 216, allowing the bottom hole assembly 216 to transfer the added weight to the drill bit 220, and in turn, to assist the drill bit 220 in penetrating the surface 204 and subsurface formations 210.

Thus, it may be seen that in some embodiments, the systems 100, 200 may include a drill collar 218, a downhole tool 219, and/or a wireline logging tool body 102 to house one or more resistivity measurement tools 120, similar or identical to apparatuses described later herein. Components of the system 1900 in FIG. 19 described later herein may also be housed by the downhole tool 219 or the tool body 102.

Thus, for the purposes of this document, the term "housing" may include any one or more of a drill collar 218, a downhole tool 219, or a wireline logging tool body 102 (all having an outer wall, to enclose or attach to magnetometers, sensors, fluid sampling devices, pressure measurement devices, transmitters, receivers, acquisition and processing logic, power supplies (such as provided by batteries, auxiliary generators, etc.) and data acquisition systems). The downhole tool 219 may comprise an LWD tool or MWD tool. The wireline tool body 102 may comprise a wireline logging tool, including a probe or sonde, for example, coupled to a logging cable 114. Many embodiments may thus be realized.

In cases for which the downhole tool 219 includes a resistivity measurement tool, the downhole tool 219 operates over a range of frequencies to capture resistivity measurements at various resolutions and various distances from the downhole tool 219. However, some signals that can be present downhole, e.g., downhole noise or interference sources, can interfere with the downhole tool 219, leading to inaccurate measurements, overly-large power consumption, and other concerns. For example, antennas of the downhole tool 219 can vibrate and generate microphonic noise with the same frequency as the vibration. In embodiments, the frequency of the vibration (and the frequency of the microphonic noise) can be relatively low-frequency, or about 20 Hz to 20 kHz).

By way of additional noise and interference examples, the specific geometry of the drill collar 218 or other components may tend to resonate at certain vibration frequencies, creating a very large signal that may cause interference with downhole tool 219 signals. In examples, the downhole tool 219 can operate at one or more frequencies, in a range over a few hundred Hertz (Hz) to 100 kilohertz (kHz) for a VDR tool, while conventional/shallow resistivity tools might use a range from 100 kHz to 10 MHz. The lower operating frequencies in particular may be more affected by noise and interference, although any of the operating frequencies of the downhole tool 219 could be affected. For example, higher-frequency interference can be generated by the transmitter of another tool in the drill string 208, by in-band currents flowing down the drill collar 218, EMI from downhole motors/generators/switching power supplies, etc.

Although the downhole tool 219 could transmit at a sufficiently high power such that the downhole tool 219 signal level is always sufficiently above the level of any potential interference, operators may prefer not to operate the downhole tool 219 at high power at least because power downhole is expensive or limited, and difficult to provide. Embodiments provide methods, and apparatuses and systems to use those methods, which permit downhole tool 219 operation outside of any frequency bands where there is interference. Embodiments can therefore provide apparatuses that overcome noise and other interference without using excessive power. Methods in accordance with various embodiments determine where noise sources exist along a frequency spectrum or set of frequency spectra. In embodiments, a resistivity test module or recorder is placed downhole and run under various conditions (for example, under various drill string operational parameters (e.g., RPMs, mud flow rates, etc.) to analyze the noise spectrum and to identify where the problem frequency bands may exist on the frequency spectrum/spectra.

Because downhole conditions and toolstring configurations vary, and because each antenna of a downhole tool 219 will not necessarily be identical, the vibration frequencies, harmonics and resonances present in the downhole environment will vary as well. These variances complicate the selection of operating frequencies for noise and interference avoidance. Further, even though a downhole tool 219 may use multiple operating frequencies, it is difficult and impractical to determine if and which of the multiple operating frequencies of the downhole tool 219 may be affected by interference and the extent to which operating frequencies will be affected without direct knowledge of the interference at the time of the measurement. Embodiments described herein provide a dynamic, flexible, and real time or near real-time solution for avoiding interference and noise frequencies altogether.

Figure 3:
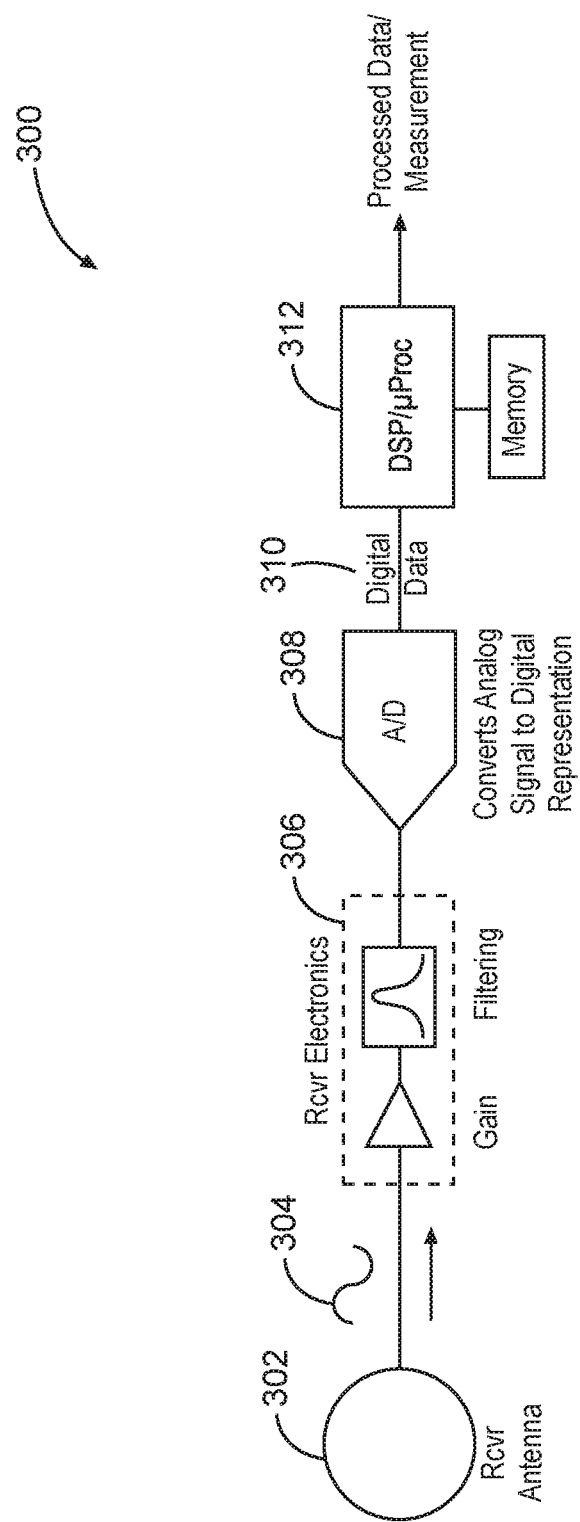
FIG. 3 is a block diagram of a downhole receiver according to various embodiments.

FIG. 3 is a block diagram of a downhole receiver 300 that can be used to detect frequencies of noise and interference according to methods described herein with respect to various embodiments. The downhole receiver 300 can be included in a housing with the downhole tool 219 (FIG. 2), or in the logging tool body 102 (FIG. 1), and the downhole receiver 300 can be part of the downhole tool 219 (e.g., as a separate portion of a resistivity tool or VDR tool), or the downhole receiver 300 can be included as a separate test module or test assembly.

The downhole receiver 300 includes an antenna assembly 302. The antenna assembly 302 is described in more detail below with reference to FIGS. 6, 8, and 10, but, briefly, the antenna assembly 302 includes an antenna winding for receiving a signal 304 that represents downhole noise. The downhole receiver 300 further includes receiver electronics 306 for amplifying and filtering the signal 304 (among other operations), and an analog-to-digital converter (ADC) 308 configured to convert the signal 304 to a sampled signal 310. A direct digital conversion can be performed in some embodiments, wherein the frequency of the signal 304 received at the antenna assembly 302 is the same frequency as the signal sampled and converted by the ADC 308 (i.e. essentially a software defined radio, SDR, receiver architecture). However, embodiments are not limited thereto, as will be described in more detail later herein with respect to FIG. 13.

Still referring to FIG. 3, the downhole receiver 300 further includes a processor 312 to detect the frequency of a noise component of the sampled signal 310 from inspection of a frequency domain representation of the sampled signal 310. The processor 312 can adjust at least one operating frequency for the downhole tool 219 such that at least that operating frequency is outside a frequency range from the frequency of the noise component (or interference component). The required distance in frequency (Hz) between the operating frequency and a noise/interference source will depend on the acceptable SNR/noise level of the system/measurement, the bandwidth/Q of the receiver tuning/filtering, and the bandwidth of the noise/interference source. The processor 312 can additionally or alternatively detect severity of the noise component, as measured by signal strength/amplitude or power, typically in units of volts (V) or dBm. Alternatively, the power or amplitude spectral density (PSD or ASD) could be used, in units of $V^2/Hz$ or $V/\sqrt{Hz}$ respectively. The processor 312 can adjust at least one operating frequency based on both the frequency and the severity of the noise component. Additionally or alternatively, the processor 312 can adjust output power of the downhole tool 219 based on the severity of the noise component.

The processor 312 can perform calculations such as, for example, a Fast Fourier Transform (FFT) or a Discrete Fourier Transform (DFT) to determine the frequency content of the sampled signal 310. The FFT is an algorithm implemented to optimize computation of the DFT for a discretely sampled time series. The DFT has the general form:

$$F[n] = \sum_{k=0}^{N-1} f[k] e^{-j\frac{2\pi}{N}nk} \quad (1)$$

where n=0: N−1, N is the total number of discrete samples of the signal, and the summation for each n will correspond to the following frequencies:

$$f = 0, \frac{f_s}{N}, \frac{2f_s}{N}, \ldots \frac{(N-1)f_s}{N} \quad (2)$$

Figure 4:
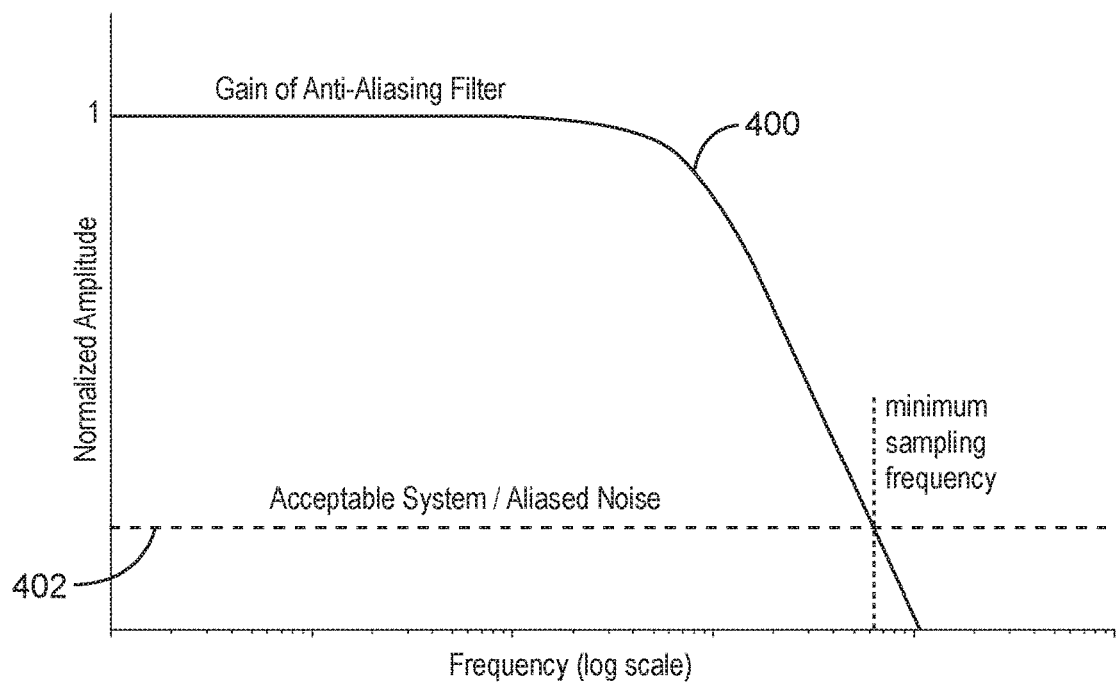
FIG. 4 is a chart illustrating sampling frequency considerations in various embodiments.

FIG. 4 is a chart illustrating sampling frequency considerations in various embodiments. As defined by the Nyquist rate, to prevent aliasing, the sampling frequency $f_s$ should be at least double the highest frequency component present in the signal being analyzed. This can be an unduly-high sampling frequency in that using that sampling frequency will result in generation of large amounts of data that are difficult to process downhole. Accordingly, methods in accordance with some embodiments lower this sampling frequency through use of an anti-aliasing (low-pass or band-pass) filter, which limits the bandwidth of the signal 304. In at least these embodiments, the anti-aliasing filter will limit the bandwidth of the signal 304 to exactly the highest frequency of interest, rather than the highest frequency that is present in the signal being analyzed, wherein a frequency of interest can include a nominal operating frequency of the downhole tool 219. Methods in accordance with embodiments will also account for the rolloff 400 of the anti-aliasing filter. In summary, then, the sampling frequency $f_s$ is decided based on a combination of the highest frequency component of interest, the rolloff 400 of the anti-aliasing filter (the higher the order of the filter, the sharper the rolloff 400, but with an increase in complexity), the highest frequency component of the signal 304 after filtering, and the acceptable aliasing/noise level 402 that can be tolerated by the downhole tool 219.

The sampling (i.e., measurement) duration is defined as the time duration for which the signal 304 is sampled before computing the FFT based on noise/accuracy requirements of the measurement/system. A longer sampling duration will have less noise due to the averaging effect of including a greater number of time periods or cycles of each frequency component, and a longer sampling duration will also increase the frequency resolution of the FFT according to FFT frequency resolution=$f_s/N$ or $1/T$, wherein $f_s$ is sampling frequency in Hz, N is the number of samples, and T is the sampling duration in seconds. However, a longer sampling duration will also lead to a correspondingly larger amount of data and longer computation time.

Figure 5:
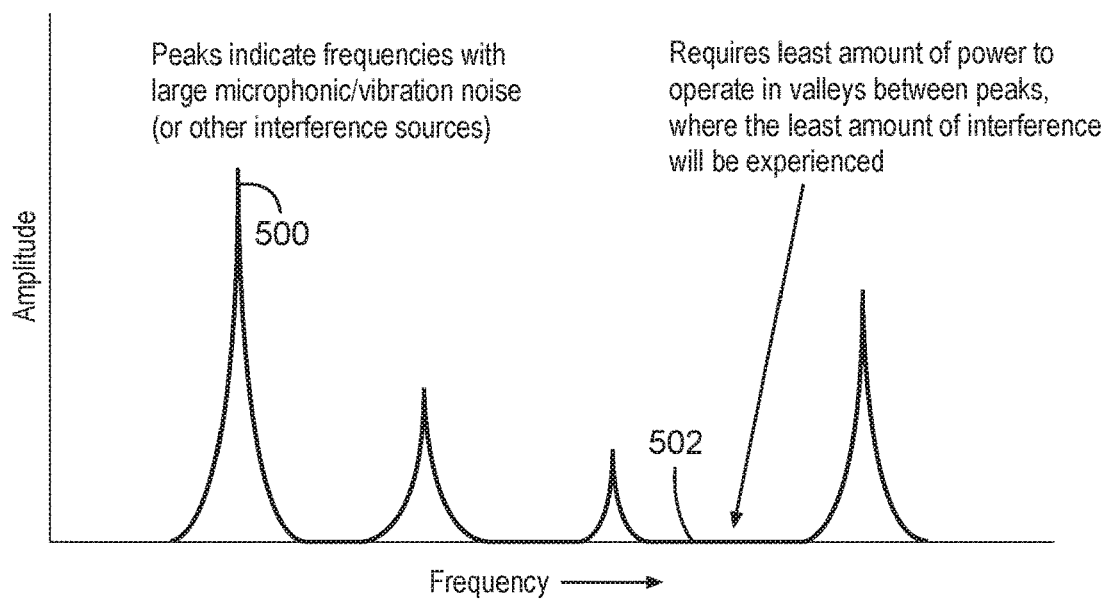
FIG. 5 illustrates a frequency spectrum with peaks representative of microphonic noise or interference.

An entire spectrum of interest could be computed and analyzed for microphonic noise, given sufficient sampling duration that obtains the desired frequency resolution with a sufficiently high sampling frequency $f_s$. The resulting spectrum may resemble FIG. 5, which illustrates a frequency spectrum with peaks 500 representative of microphonic noise or other interference sources. The optimum operating frequencies would be in the valleys 502 between peaks 500, as these operating points would require the least amount of power from the downhole tool 219 transmitter.

However, memory and processing power will typically be limited, such that real-time calculations downhole will be restricted, so that analyzing the entire spectrum of interest will consume substantial computing time or power. Furthermore, it can be impractical to telemeter data to a surface system for processing because the bitrate needed to handle the large amount of raw data needed to compute the FFT for the noise/frequency spectrum over the entire potential operating band of the downhole tool 219 exceeds the capabilities of many telemetering systems (e.g., mud pulse telemetry systems). Some example resistivity tools process the data downhole using lookup tables that fit real-time data into bins of predetermined resistivity values based on the phase/attenuation measurement, rather than processing the data and providing an exact value for the measurement. In at least these available systems, the raw data is later read out of the tool on the surface and used to calculate exact values during post run processing.

Embodiments provide greater accuracy than available systems using lookup tables, without consuming large amounts of power, and with reduced computing time. Embodiments also provide for greater resolution that may be useful for various applications. As described earlier herein, a downhole tool 219 (such as a VDR tool), may operate down to the hundreds of Hz, and embodiments may therefore provide accuracy an order of magnitude smaller (i.e., in the tens of Hz), to determine where microphonic noise exists in real time. Accordingly, apparatuses and methods in accordance with various embodiments use a sample duration T of about 100 milliseconds (ms), where resolution=1/T=10 Hz. Accordingly, given a 200 kHz sampling frequency (e.g., $f_s$=200 kHz, which would include frequencies of interest up to 100 kHz) and a 100 ms sampling duration, N=20,000 samples (100 ms×200 kHz) would be captured for a DFT. Because the FFT operates based on a number of samples that is a power of 2 (assuming the common radix-2 algorithm), methods in accordance with embodiments reduce N to 16,384 ($2^{14}$). To accomplish this, embodiments use a sample period of 81.92 ms, giving a resolution of about 12.2 Hz, which is still sufficiently fine resolution to detect noise and interference at lower frequency ranges. However, this is a fairly large number of samples, and although computation of the FFT for a N this size could be accomplished with the current downhole electronics, this computation will result in a large number of operations and computation time given the limited memory and processing power, particularly since this type of analysis would likely be performed repeatedly, potentially before each VDR measurement. Thus further optimization would be desirable.

Adjustment of Sampling Parameters for Efficient Bandwidth Around Nominal Operating Points Thereby Reducing Computation Requirements As will be appreciated based on the discussion earlier herein, embodiments that discern noise and interference peaks at low frequencies may need a fine resolution, and thus a longer sample period, while embodiments for detecting high frequencies of interest may need a high sampling frequency $f_s$ to detect the highest frequency of interest while preventing aliasing. However, although the lowest and highest possible frequencies for some downhole tools 219 may include a frequency range from 100 Hz to 100 kHz (for a VDR tool, while conventional/shallow resistivity tools might use a range from 100 kHz to 10 MHz), the downhole tool 219 may not use that entire band. On the contrary, the downhole tool 219 may use only a few discrete operating frequencies. Moreover, the transmitting (and possibly receiving) antennas of some available downhole tools 219 are tuned to those selected discrete operating frequencies to increase or enhance antenna efficiency, and transmitting outside the tuned center frequency requires more power, eventually defeating the purpose of tuning the antennas.

Figure 6:
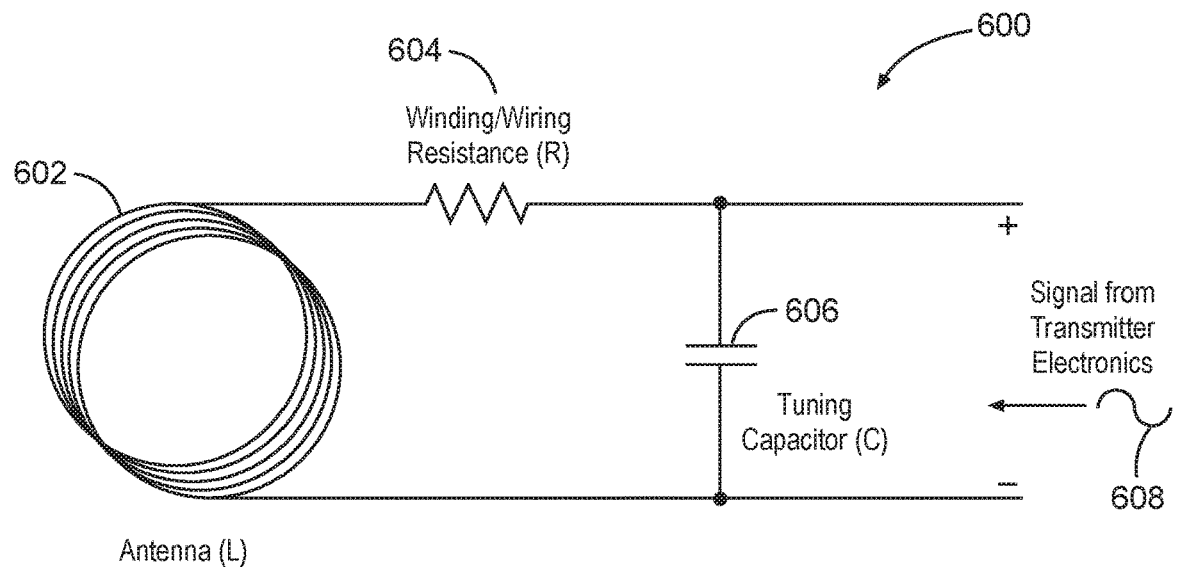
FIG. 6 is a schematic diagram of a parallel-tuned transmitter antenna that can be used in a downhole tool according to various embodiments.

FIG. 6 is a schematic diagram of a parallel-tuned transmitter antenna 600 that can be used in a downhole tool 219 according to various embodiments. The parallel-tuned transmitter antenna 600 includes antenna wiring 602, with resistance modeled as resistance 604, and a tuning assembly including a tuning capacitive element 606. The parallel-tuned transmitter antenna 600 receives a signal 608 from transmitter electronics, which can be incorporated in the downhole tool 219 housing. The parallel-tuned transmitter antenna 600 may also be used as receiver antenna in antenna assembly 302 (FIG. 3).

Figure 7:
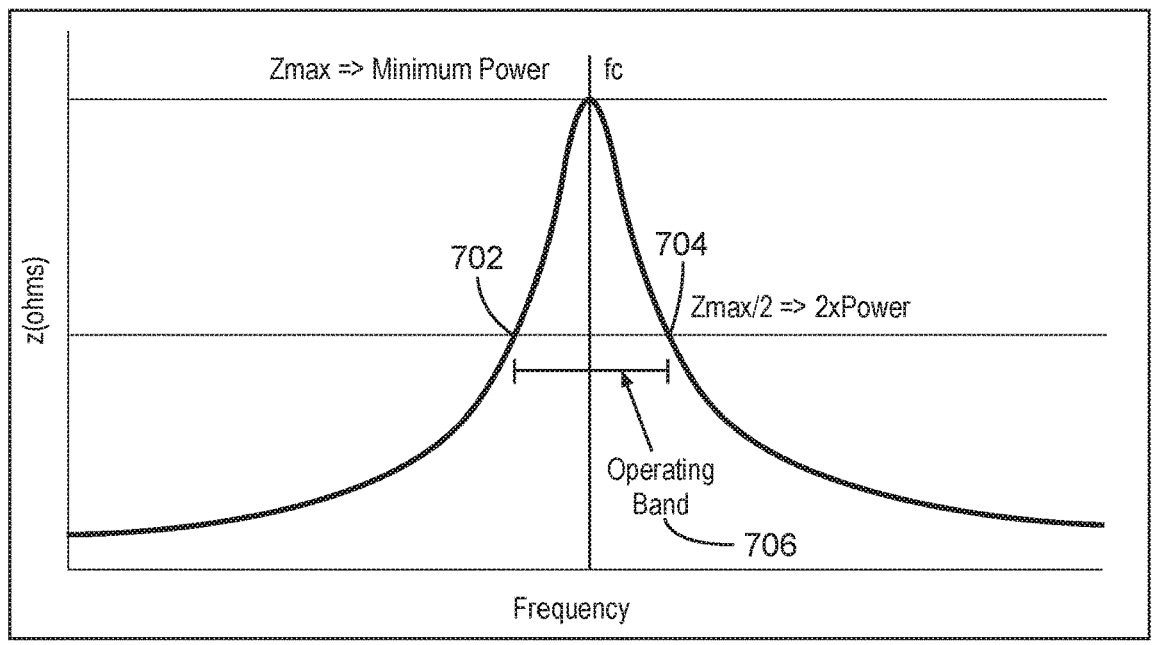
FIG. 7 illustrates impedance as a function of frequency in a parallel-tuned transmitter antenna.

FIG. 7 illustrates impedance as a function of frequency in a parallel-tuned transmitter antenna 600 (FIG. 6). A tuned transmitter (or receiver) antenna, such as, for example, the parallel-tuned transmitter antenna 600, will have a center frequency $f_c$ as given by:

$$f_c = \frac{1}{2\pi\sqrt{LC}} \quad (3)$$

where L is the inductance of the antenna wiring 602 (FIG. 6), in Henries, and C is the capacitance of the tuning capacitive element 606 (FIG. 6). The resistance 604 (FIG. 6), which can also include skin and proximity effects that increase with frequency, has the effect of reducing the center frequency $f_c$ slightly, and the Q of the antenna is given by:

$$Q = \frac{2\pi f L}{R} \quad (4)$$

FIG. 7 illustrates impedance of a parallel-tuned transmitter antenna 600 (FIG. 6). The impedance (Z) will reach a maximum $Z_{max}$ at the center frequency $f_c$, which is where antenna power will be at a minimum for a given voltage across the antenna wiring 602 (FIG. 6). In embodiments, it may be preferable to only operate the downhole tool 219 at a frequency between frequency 702 and 704, over band of interest 706, which includes a range off from the center frequency $f_c$ up to the point where the impedance Z has dropped to half of the maximum impedance Z. Operating at this frequency this would result in twice the antenna power for the same voltage.

Methods and apparatuses in accordance with various embodiments may perform noise and interference detection only within the band of interest 706 or within a range outside the band of interest 706, to reduce processing power and computation time in detecting noise and interference. By way of nonlimiting example, with reference to FIG. 6 and FIG. 7, an antenna wiring 602 having an inductance of 3.1 mH can be parallel-tuned at about 10 kHz with a 82 nanofarad (nF) capacitive element 606. At 10 kHz the antenna wiring 602 has a series resistance 604 of about 10 ohms (Ω) and thus a Q of about 19.5. This would result in a $Z_{max}$ of about 3.8 kΩ, and a band of interest 706 from about 9.55 kHz to about 10.43 kHz in which methods and apparatuses in accordance with embodiments will attempt detection of noise and interference.

Methods and apparatuses in accordance with embodiments may also detect noise and interference in the spectrum over a wider band than the band of interest 706. For example, embodiments may investigate a 2-kHz band centered at 10 kHz (10 kHz+/−1 kHz) at least once before making a resistivity measurement. The size of the frequency band to analyze may be set based at least in part on parameters of the filters used on the receiver electronics 306 (FIG. 3) and the tuning parameters of receiver antennas of the downhole tool 219. A tuned receiver antenna can have a sensitivity curve similar to the impedance curve of the transmitter antenna that was discussed above with reference to FIG. 7.

Still with reference to the above example, with a 2 kHz band centered at 10 kHz, the highest frequency of interest would be 11 kHz, assuming the high frequency cutoff of the filter(s) on the receiver electronics 306 (typically band-pass) will act as an anti-aliasing filter. Methods and apparatuses in accordance with various embodiments could over-sample at a sampling frequency $f_s$ of about 50 kHz. In at least this example, embodiments can use a frequency resolution in the range of 10-100 Hz to accurately discern noise/interference peaks in the spectrum, which would give a sample period T=20.48 ms for a resolution of about 48.8 Hz and samples N=1024 ($2^{10}$), although embodiments can increase or decrease resolution by increasing or decreasing the sample period of T, for enhanced or reduced accuracy with a tradeoff in computation speed and power. Note that sample number N has been greatly reduced (by 16×) compared to the example described earlier herein (N=16,384=$2^{14}$).

By limiting the band of interest 706 to be examined, noise and interference frequencies can be detected with improved accuracy and speed over the limited band of interest 706, relative to attempting to detect noise and interference over a wider spectrum, while still meeting operational goals of the downhole tool 219 and of other components and modules discussed herein.

It will be appreciated that, although a smaller band of interest 706 may be inspected for noise and interference, the FFT algorithm according to various embodiments will produce a complete spectrum from 0 Hz to 25 kHz (e.g., $f_s/2$). However, receiver electronics 306 elements, such as a band pass filter or other filter, will operate to prevent noise sources from interfering with the downhole tool 219 outside the band of interest 706.

Additionally, embodiments are not limited to FFT algorithms, and DFT algorithms can also be used over the band of interest 706. Other methods such as specialized FFT algorithms (e.g., FFT algorithms specific to all-real data, symmetric data, etc.), Non-Uniform DFT (where the signal is sampled at uneven intervals), or wavelet analysis can be used to define a variable spectral resolution where the frequencies are at uneven intervals, allowing further optimization of the frequency for a given N number of samples.

In addition, resolution can be gained by frequency shifting, by multiplying the samples by the factor given by:

$$e^{\pm j2\pi \Delta f n} \quad (5)$$

where $\Delta f$ is the frequency to be shifted and n is the sample number.

Figure 8:
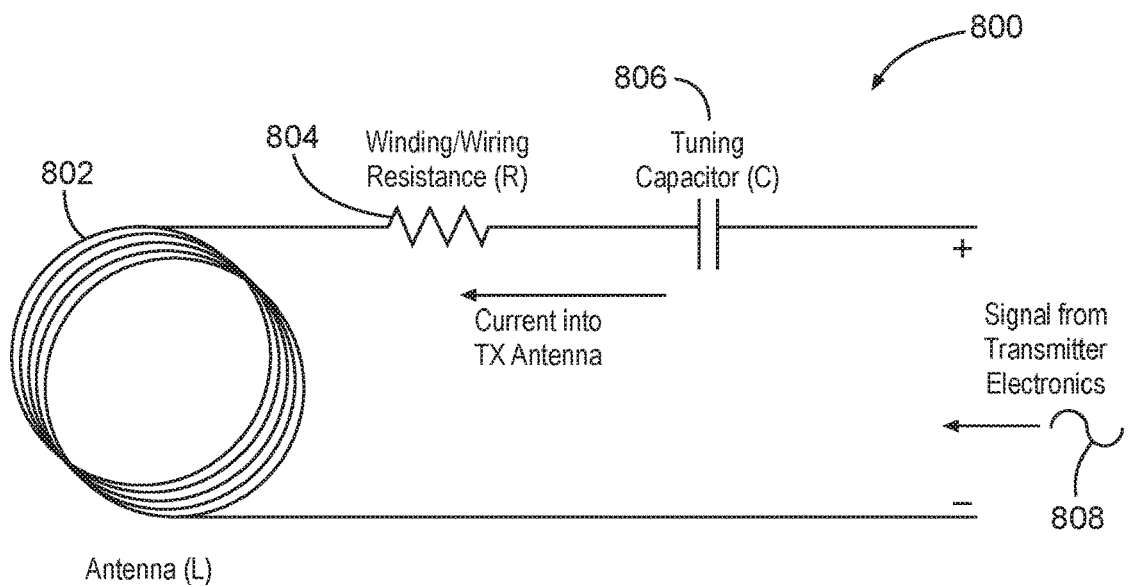
FIG. 8 is a schematic diagram of a series-tuned transmitter antenna that can be used in apparatuses according to various embodiments.

Methods and apparatuses in accordance with some embodiments can include a series-tuned transmitter antenna, in place of or in addition to parallel-tuned transmitter antennas that were described earlier herein. FIG. 8 is a schematic diagram of a series-tuned transmitter antenna that can be used in apparatuses according to various embodiments. The series-tuned transmitter antenna 800 includes antenna wiring 802 having inductance L, with resistance modeled as resistance 804, and a tuning capacitive element 806 in series with the antenna wiring 802. The series-tuned transmitter antenna 800 receives a signal 808 from transmitter electronics, which can be incorporated in the downhole tool 219 housing. The series-tuned transmitter antenna 800 may also be used as a receiver antenna.

Figure 9:
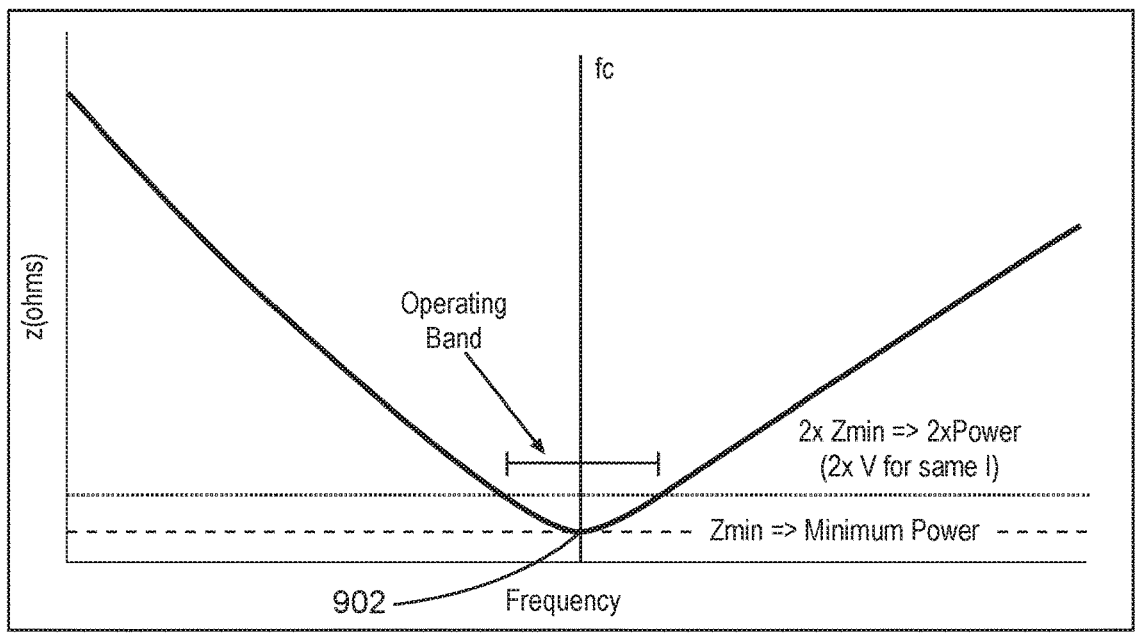
FIG. 9 illustrates impedance as a function of frequency in a series-tuned transmitter antenna.

FIG. 9 illustrates impedance as a function of frequency in a series-tuned transmitter antenna. As illustrated by FIG. 9, in the case of series-tuned transmitter antennas including, for example, the series-tuned transmitter antenna 800 (FIG. 8), impedance is at a minimum 902 at the tuned center frequency $f_c$, to allow a large amount of current to flow thru the antenna at a very low voltage, minimizing power P (wherein power P=voltage V×current I). Tuning efficiency of the series-tuned transmitter antenna 800 will be lost if the series-tuned transmitter antenna 800 is operated outside a threshold frequency-referenced distance from the center frequency $f_c$. As the impedance increases, ever-increasing amounts of voltage are needed to achieve the same current through the series-tuned transmitter antenna 800. Additionally, if voltage is held constant, an increase in impedance leads to a corresponding decrease in current, and corresponding decrease in signal strength at the antenna assembly 302 (FIG. 3).

If an acceptable operating point (e.g., an operating frequency that avoids the frequencies where noise or interference have been detected) cannot be found within the allowable operating band of the series- or parallel-tuned transmitter antenna 600 or 800, methods in accordance with various embodiments can extend the operating band of the series- or parallel-tuned transmitter antenna 600 or 800 by adjusting the center frequency $f_c$. In some available resistivity tools, relay switches are included to switch different tuning capacitors in or out of the corresponding tuning circuit. In these or other available resistivity tools, relay switches can also remove or add turns of the antenna wirings 602 or 802. Accordingly, these relay switches can tune series- or parallel-tuned receiver or transmitter antennas to multiple operating frequencies. Embodiments can provide such switches to extend the operating window of a single nominal operating frequency for a downhole tool 219.

Figure 10:
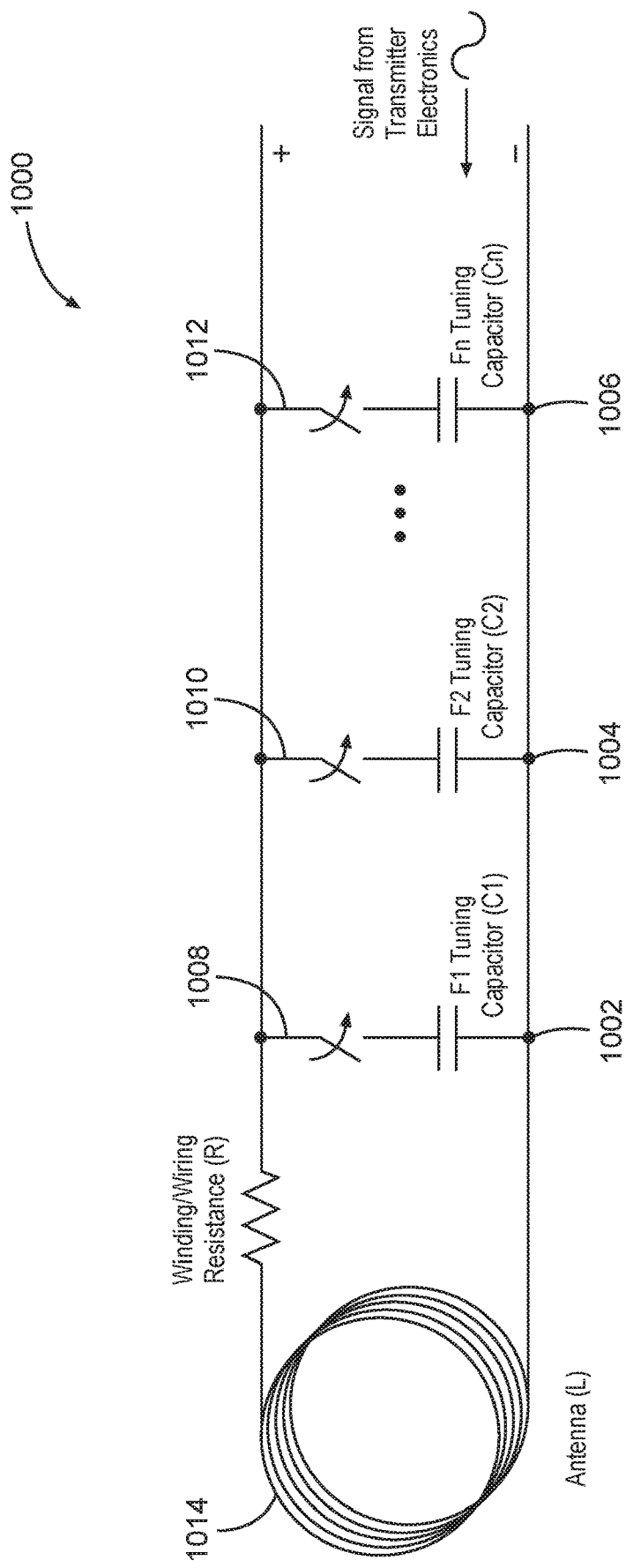
FIG. 10 is a schematic diagram of a parallel-tuned transmitter antenna with multiple selectable tuning elements that can be used in apparatuses according to various embodiments.

FIG. 10 is a schematic diagram of a parallel-tuned transmitter antenna 1000 with multiple selectable tuning elements 1002, 1004, and 1006 that can be used in apparatuses according to various embodiments. Switching elements 1008, 1010, and 1012 can be controlled (e.g., by the processor 312 (FIG. 3) or other control circuitry or control logic), to switch in one or more of the tuning elements 1002, 1004 and 1006. Capacitive elements C1, C2 and C3 can have the same or different capacitive values. Switching elements 1008, 1010, and 1012 can also be controlled to remove one or more coils from the antenna winding 1014. Although such circuitry might give rise to the need to investigate a wider frequency band to detect noise and interference, leading to a larger sample size, embodiments utilizing the circuitry illustrated in FIG. 10 would provide a means to extend the efficient bandwidth of a tuned transmitter or receiver antenna (e.g., the parallel-tuned transmitter antenna 600, the series-tuned transmitter antenna 800, etc.) to obtain an operating frequency with a noise/interference level adequately low to support drilling and exploration operations.

Figure 11:
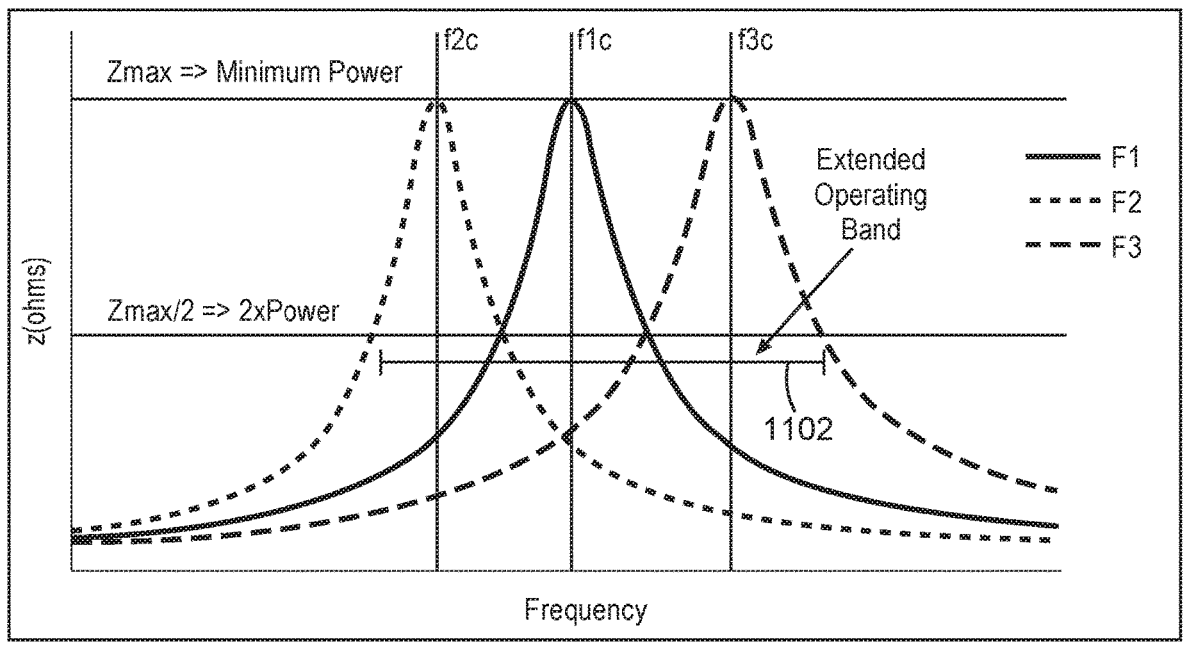
FIG. 11 illustrates impedance as a function of frequency in a parallel-tuned transmitter antenna with multiple selectable tuning elements.

FIG. 11 illustrates impedance as a function of frequency in a parallel-tuned transmitter antenna 1000 (FIG. 10) with multiple selectable tuning elements. Operating frequencies $f_{1c}$, $f_{2c}$ and $f_{3c}$ can be implemented by switching in or out one or more tuning elements 1002, 1004 and 1006 (FIG. 10), to generate spectra F1, F2 and F3. An extended operating band 1102 is thereby created for a downhole tool 219 that includes antennas the same or similar to the parallel-tuned transmitter antenna 1000.

Methods to Decrease Sampling Frequency, Reduce Number of Samples while Maintaining Sampling Duration In addition to the above-described embodiments and solutions for adjusting sampling parameters for efficient bandwidth around center frequencies, methods and apparatuses in accordance with other embodiments allow for reducing the sampling frequency $f_s$ (and therefore allowing for reduced number of samples N) while maintaining or increasing resolution or sampling duration T.

In embodiments, components of the systems shown in FIG. 3, for example, the receiver electronics 306, processor 312, or other components, can filter the received signal 304 to limit the bandwidth of the received signal 304 to correspond to a frequency of interest. Under sampling (e.g., bandpass sampling, sub sampling, or down sampling) can be used, wherein the received signal 304 (FIG. 3) is bandpass filtered to eliminate most or all frequencies outside the desired frequency band to limit the bandwidth of the received signal to correspond to a frequency of interest. The processor 312 can select the sampling frequency $f_s$ and the sampling duration T to provide undersampling at a rate below a Nyquist rate associated with a frequency of interest (i.e. twice the frequency of interest), to create lower frequency aliases (within the band $f_s/2$, i.e. below the Nyquist frequency) of the higher frequency, which can be used to reconstruct the higher frequency signals. The sampling frequency $f_s$ can be any frequency below the Nyquist rate associated with the frequency of interest but should be at least double the bandwidth of a filtered frequency band corresponding to the frequency of interest. Ideally, the sampling frequency $f_s$ could be chosen as the lowest frequency that is an integer division of the frequency of interest that is also at least double the bandwidth of the filtered frequency band corresponding to the frequency of interest, such that the frequency of interest is aliased directly to baseband with the lowest possible sampling frequency $f_s$. However, any sampling frequency $f_s$ lower than the Nyquist rate may be chosen to alias the frequency of interest to a particular/desired lower frequency, given by the expression:

$$f_{alias} = f_s/2 - abs(modulo(f, f_s) - f_s/2) \quad (6)$$

where f is the frequency of interest.

Figure 12:
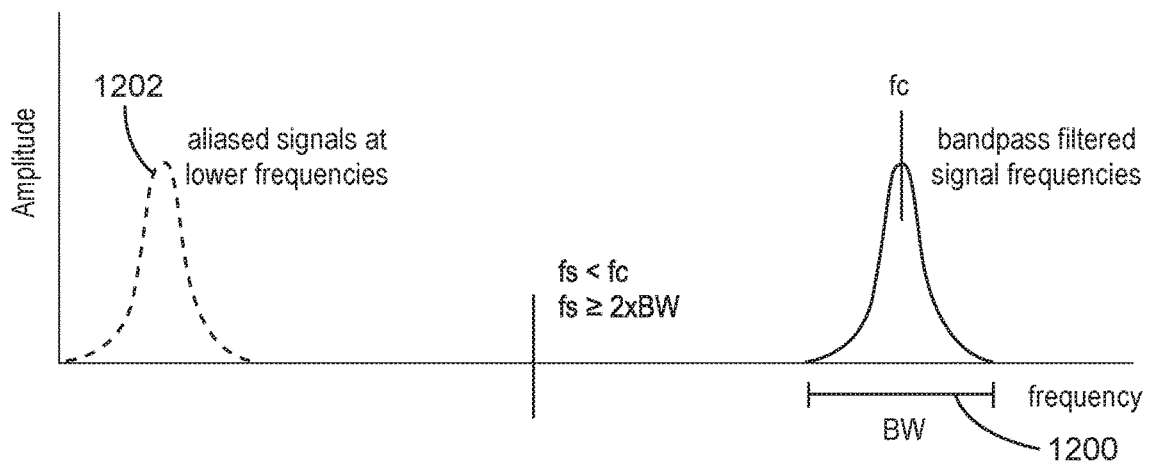
FIG. 12 illustrates use of band-pass filtering and under sampling to create lower frequency aliases in accordance with various embodiments.

FIG. 12 illustrates use of band-pass filtering and under sampling to create lower frequency aliases in accordance with various embodiments. In FIG. 12, the sampling frequency $f_s$ is less than the higher frequency $f_c$, while having at least double the bandwidth 1200 of the higher frequency band. Sampling at this $f_s$ generates aliased signals 1202 at lower frequencies. Embodiments implementing these methods therefore can reduce the sampling frequency $f_s$ (and therefore the number of samples N) while concurrently increasing sampling duration T and the resolution of the measured frequency spectrum.

Figure 13:
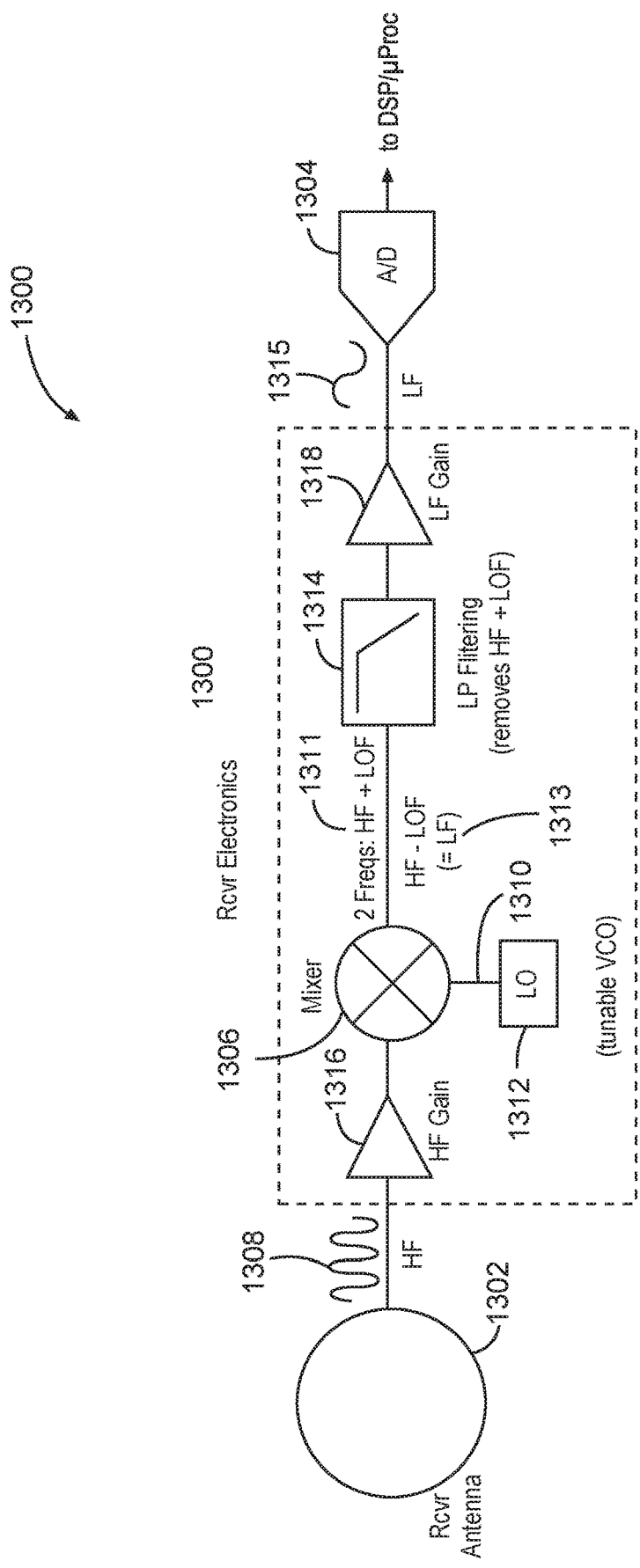
FIG. 13 is a schematic diagram of a super-heterodyne receiver front end using frequency mixing to convert a high frequency to a low frequency for sampling in accordance with various embodiments.

Methods and apparatuses in accordance with still other embodiments implement a super-heterodyne receiver front end. FIG. 13 is a block diagram of a super-heterodyne receiver front end 1300 in accordance with various embodiments coupled to the antenna 1302 and to the ADC 1304. In contrast to systems described earlier herein with reference to at least FIG. 3, instead of performing direct digital conversion, wherein the frequency received at the antenna is the same frequency that the ADC 308 samples and converts to digital representation, a super-heterodyne receiver uses frequency mixing to convert the frequency received at the antenna 1302 to a lower frequency to be sampled by the ADC 1304.

Methods utilizing the super-heterodyne receiver front end 1300 can include performing a mixing operation and low pass filtering operation on the received signal 1308 to generate a converted signal, and providing the converted signal 1315 for the sampling. As shown in FIG. 13, the mixer 1306 uses two inputs, the signal 1308 from the antenna and the signal 1310 from a Local Oscillator (LO) 1312, to create signals 1311 and 1313 with two different frequencies at the output. The two frequencies can include a higher frequency 1311 that is the sum of the two input frequencies (e.g., the sum of the frequencies of signal 1308 and 1310), and a lower frequency 1313 that is the difference between the two input frequencies (e.g., the difference between the frequency of signals 1308 and 1310). Low pass filtering 1314 removes the higher frequency, leaving only the lower frequency, typically referred to as the intermediate frequency (IF), as a converted signal 1315 to be sampled by the ADC 1304. The receiver front end 1300 can additionally include a HF gain amplifier 1316 and an LF gain amplifier 1318.

The use of a tunable oscillator, like a Voltage Controlled Oscillator (VCO), would allow apparatuses in accordance with various embodiments to adjust the LO 1312 for different operating bands, allowing the same filter, sampling frequency $f_s$, and sample duration T to be used on each operating band. As with under sampling, a very high spectral resolution can be achieved with a much lower sampling frequency $f_s$. Accordingly, a lower number N of samples will be generated, reducing the computing power and operating power needs of the downhole tool 219.

Figure 14:
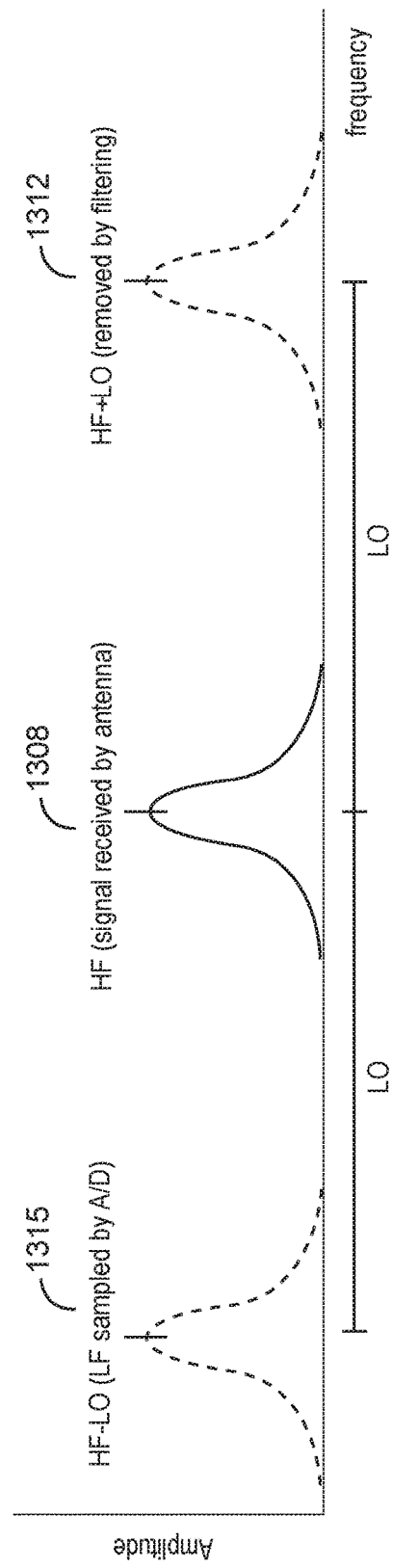
FIG. 14 illustrates frequency mixing producing frequencies based on a local oscillator (LO) in accordance with various embodiments.

FIG. 14 illustrates frequency mixing producing frequencies based on a LO 1312 in accordance with various embodiments. Frequency spectra for signals 1315, 1308, and 1312 (FIG. 13) are shown.

In practical terms, and as is common in radio applications, an antenna 1302 will receive multiple frequencies over a predefined band simultaneously or near simultaneously, with the effect that these multiple frequencies will be offset to lower frequencies by an amount equal to the frequency of the LO. Note that alternative embodiments could include, e.g., the homodyne receiver front end (also known as the direct conversion receiver, DCR, or zero-IF receiver), where the LO frequency is equal to the higher frequency signal resulting in direct conversion to baseband (the difference between them in this case is 0); or embodiments that use 2 channels to receive the same signal where the LOs are the same frequency but with a phase difference of 90 degrees (i.e. sine and cosine LOs) to achieve quadrature sampling to obtain the in-phase (I) and quadrature (Q) component signals.

Methods Used to Create Swept-Tuned Spectrum Analyzer

The use of a tunable oscillator (e.g., VCO) as described above would facilitate a swept-tuned spectrum analyzer implementation, in which a very narrow bandpass filter, referred to herein as a Resolution Bandwidth Filter (RBW), is used to filter the intermediate frequency. In FIG. 13, the low pass filtering 1314 would be replaced by the RBW bandpass filter.

In at least these embodiments, the tunable LO (such as a VCO) would be used to sweep the band of interest over a sweep time (ST). The frequency content of the samples could be determined without performing FFT or other calculations, because the frequency content would be defined by the RBW. While these embodiments would not include FFT calculations, the ST would add to the overall processing time because the LO would be configured to sweep over a predetermined number of frequency set points to achieve the desired resolution within the band of interest. Furthermore, the ADC would sample the IF at each LO set point to create the frequency spectrum. The expression for ST is given by:

$$ST = \frac{k \times frequencyspan}{RBW^2} \quad (7)$$

where k is a proportionality constant based on the response time of the RBW filter, frequencyspan is the frequency range under consideration Hz, and RBW is the resolution bandwidth in Hz. The trade-offs between measurement time with this scheme and computation time using an FFT would depend on various factors, such as available processing power and allowable time between resistivity measurements, for example.

Figure 15:
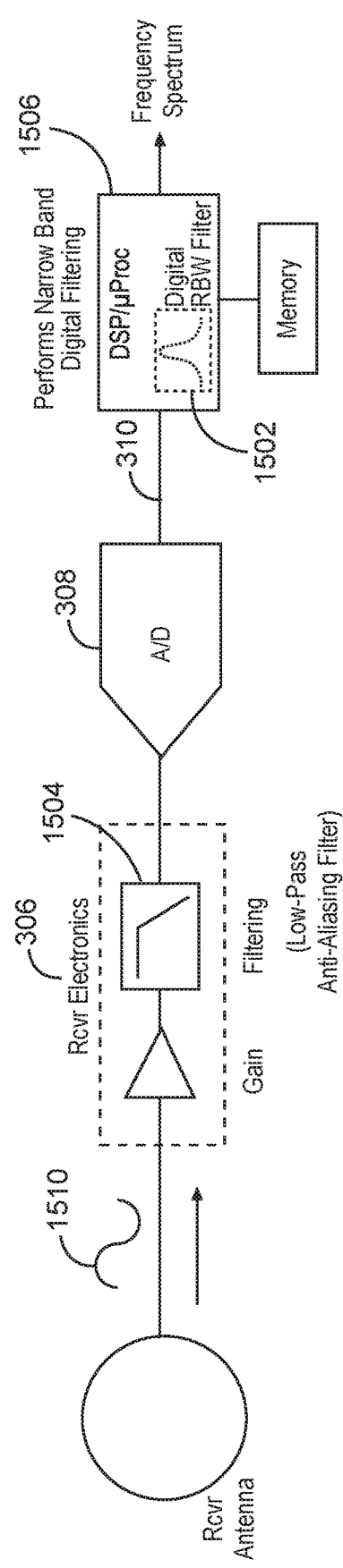
FIG. 15 is a block diagram of a receiver that includes a resolution bandwidth filter (RBW) with direct conversion architecture in accordance with various embodiments.

Other embodiments can determine frequency content without FFT or other calculation using the direct digital conversion receiver architecture similar to that shown in FIG. 3, without a tunable LO. FIG. 15 is a block diagram of a receiver 1500 that includes an RBW filter 1502 with direct conversion architecture in accordance with various embodiments. In at least these embodiments, the receiver 1500 would include an analog low-pass anti-aliasing filter 1504, and the digital signal processor (DSP) or microprocessor 1506 would perform digital filtering to create the RBW filter 1502, and sweep the frequency band of interest. Also note that in alternative embodiments, the DSP/µProcessor can perform digital mixing as well as digital filtering, such that quadrature sampling can be achieved with the direct digital conversion receiver by mixing the direct sampled signal in the digital domain to obtain the in-phase (I) and quadrature (Q) component signals.

General Methods Used to Estimate Accurate Power Spectral Density (PSD)

As will be appreciate, the vibrations causing microphonic noise are typically not constant, due to the erratic nature of the drilling environment. Other forms of interference also are often erratic. Accordingly, because a single spectrum or FFT from a single time series represents a very small window of time, a single spectrum or FFT may not sufficiently represent of the interference that the downhole tool 219 measurement is to avoid. Accordingly, some embodiments provide methods of spectral density (PSD) estimation to detect periodicities that may not be continuous, wherein these periodicities represent noise or interference.

Operations (7) illustrates creation of a periodogram:

$$\begin{bmatrix} F(0) \\ F(1) \\ \vdots \\ F(N-1) \end{bmatrix} = \begin{bmatrix} DFT \\ N \times N matrix \end{bmatrix} \begin{bmatrix} f(0) \\ f(1) \\ \vdots \\ f(N-1) \end{bmatrix} \Rightarrow \begin{bmatrix} F^2(0) \\ F^2(1) \\ \vdots \\ F^2(N-1) \end{bmatrix} \quad (8)$$

where an N×1 frequency spectrum is produced by the multiplication of the N×N Fourier matrix and the N×1 time series. Squaring the results of the DFT gives the PSD (periodogram) on the right side of the arrow.

Figure 16:
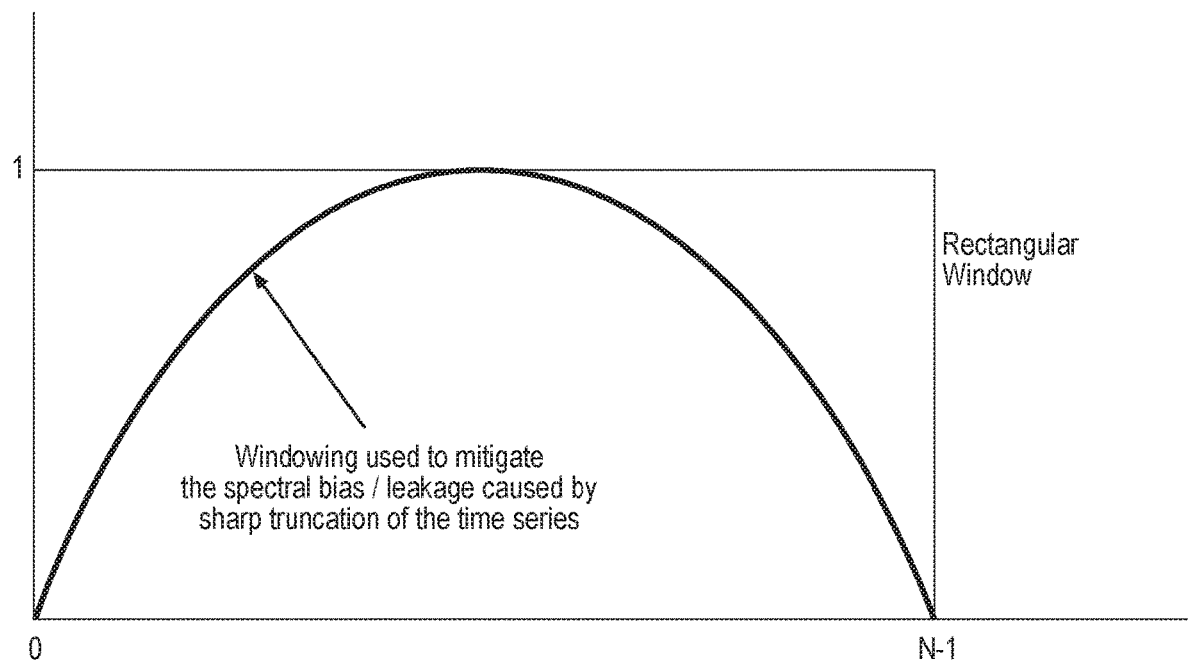
FIG. 16 illustrates a window function for tapering the time series and preventing spectral leakage in accordance with some embodiments.

Accuracy of the Fourier Transform and PSD estimation can be detrimentally affected by the spectral leakage/bias caused by the sharp truncation of the time series. This spectral leakage causes leakage of the true frequencies/power present in the signal into the side bands, which can render nearby frequency components unresolvable, even with increased resolution, and give the appearance of more frequency content than is actually present. Embodiments mitigate at least this problem by using a window function, similar to FIG. 16, which gradually tapers off the samples at the beginning and end to avoid a sharp truncation of the time series. There are a number of tradeoffs between various window functions, including the amplitude accuracy/scalloping losses, side lobe rejection, and noise floor/dynamic range. For example, the Hann (or Hanning) and the 4-term Blackman-Harris windows can perform as adequate general purpose windows with at least adequate side lobe rejection, while a Flat Top window provides better amplitude accuracy but with a wider peak/main lobe. The 7-term Blackman-Harris and Kaiser-Bessel windows have a very low noise floor/high dynamic range. Based on the system/measurement requirements of the downhole tool, and depending on the effects of varying noise/interference sources and conditions on the measurement, the optimal window can be chosen considering these tradeoffs. Also, different windows can be used at different times depending on the operating frequency, environment, and/or other factors.

Figure 17:
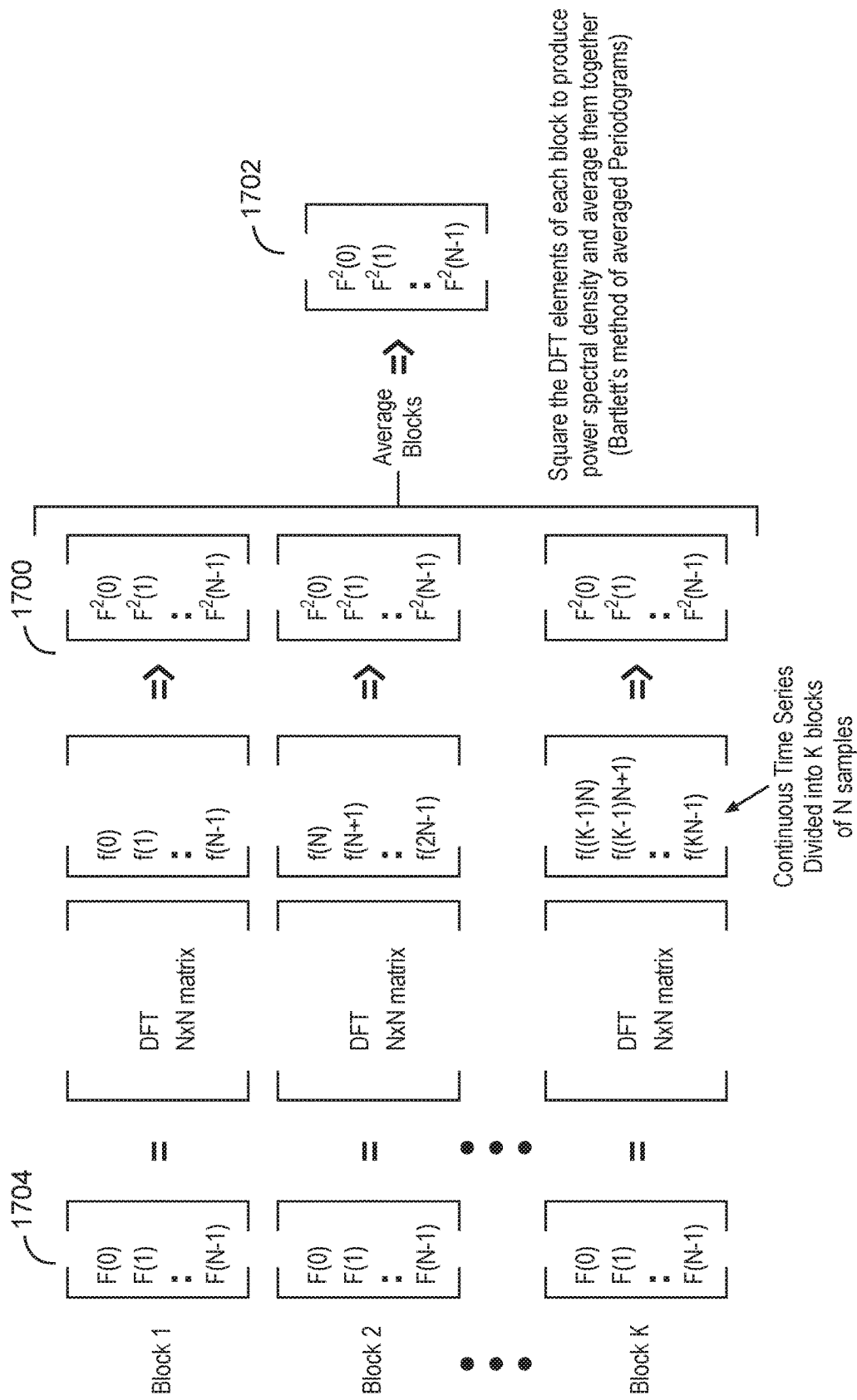
FIG. 17 illustrates a method for averaging periodograms in accordance with various embodiments.

Methods and apparatuses in accordance with some embodiments may sample received signals continuously for an amount of time to generate discretely sampled data. As shown in FIG. 17, the discretely sampled data can be divided into K blocks of N samples, shown on the left side of FIG. 17, so that smaller FFTs can be computed in real time. In embodiments, the results would be squared at 1700 to produce the PSD for each block. Methods in accordance with various embodiments can average the resulting PSDs from each block at 1702 to produce an estimate according to a method sometimes referred to as the Method of Averaged Periodograms or Bartlett's method. Other embodiments can refine this process illustrated in FIG. 17, wherein the blocks 1704 may be overlapped with a windowing method (e.g., Welch's method). Other embodiments can exercise smoothing techniques to reduce variance (e.g., Blackman-Tukey). Embodiments are not limited to these methods, and other averaging, smoothing, and processing algorithms can be implemented.

Example Methods, and Apparatuses for Performing Example Methods

Example embodiments described earlier herein provide methods, and apparatuses and systems that implement those methods, to implement a real-time downhole frequency spectrum analyzer to determine potential microphonic/vibration noise or other forms of interference that could affect resistivity measurement, particularly though not limited to Very Deep Resistivity measurement, with reduced computation time and power draws in downhole electronics. The methods described herein can be performed before every resistivity measurement, to enhance signal strength and reduce power consumption in the downhole systems. Methods described herein are not limited to using resistivity tools, but can also be useful in mitigating effects or avoiding effects caused by noise sources in short-hop telemetry, among other applications.

Figure 18:
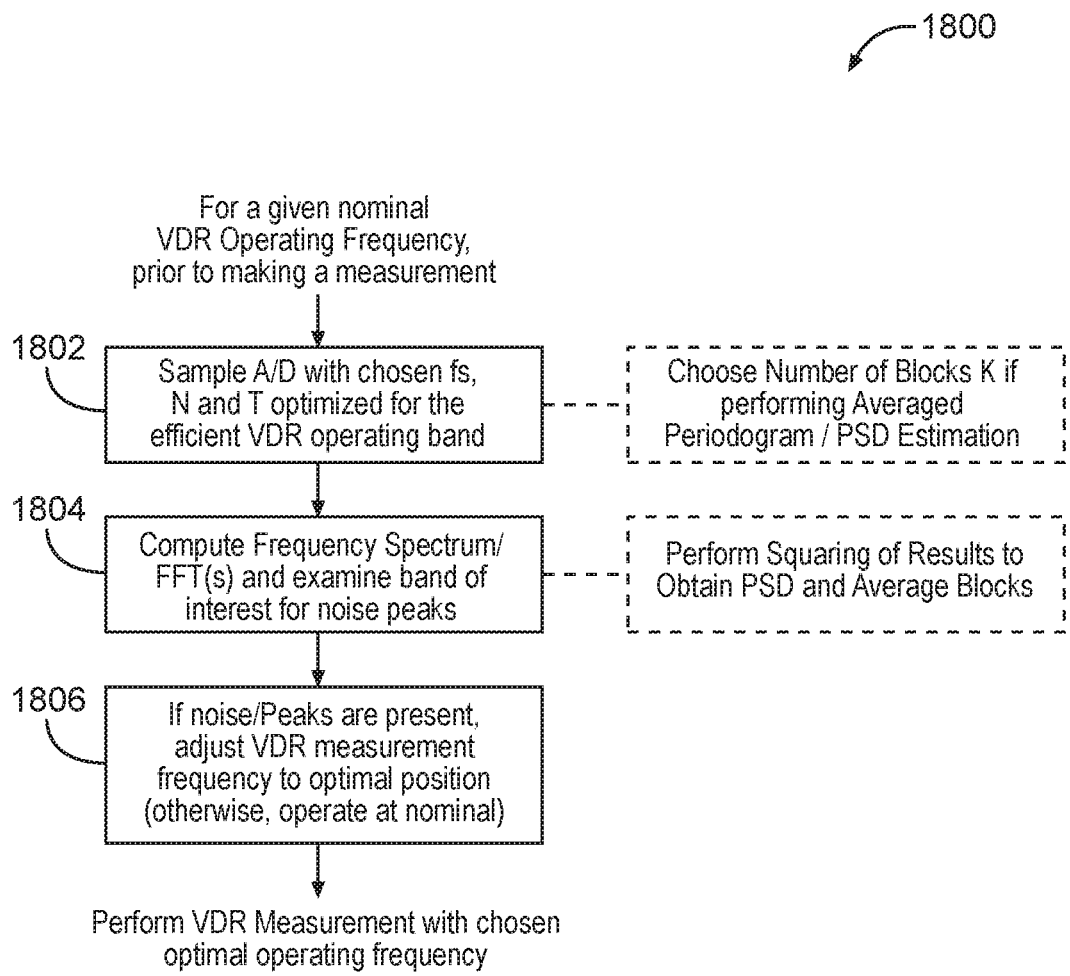
FIG. 18 illustrates a flow diagram of an example resistivity spectrum analysis with operating point optimization in accordance with various embodiments.

FIG. 18 illustrates a flow diagram of an example method 1800 for resistivity spectrum analysis with operating point optimization in accordance with various embodiments. In embodiments, at least some of the operations of example method 1800 can be performed prior to each resistivity measurement, although embodiments are not limited thereto. The example method 1800 can identify potential microphonic or vibrational noise or other forms of interference that could affect resistivity measurement, using downhole frequency spectrum analysis. Embodiments can be used for mud telemetry, acoustic telemetry, for channel probing in electromagnetic (EM) downhole telemetry applications, etc. The example method 1800 can be executed by the processor 312 (FIG. 3), other component of FIG. 3, or components described herein with reference to FIG. 19.

The example method 1800 can be performed for a given nominal resistivity tool operating frequency, wherein the resistivity tool includes a VDR tool. However, embodiments are not limited to resistivity tools. In some embodiments, operations of method 1800 can be performed using downhole tool 219 receivers, while in other embodiments a separate test receiver can implement operations of method 1800. The separate test receiver can be housed with the downhole tool 219 or in a separate housing.

The example method 1800 begins with operation 1802, with sampling a received signal that represents a downhole signal source to provide a sampled signal. The downhole signal source can include noise, interference, etc. The processor 312 or other component or module, will perform the sampling using a sampling frequency $f_s$, number of samples N, and sampling duration T that have been selected according to criteria described earlier herein with reference to FIG. 4 to provide a sampled signal. By way of nonlimiting example, and as described in more detail earlier herein, the processor 312 can select sampling frequency $f_s$, number of samples N, and sampling duration T based on a particular band of interest to define the resolution of the frequency spectrum and to reduce the number of samples N that must be used to compute the frequency spectrum (FFT).

In embodiments, the band of interest may be chosen based on the tuning of a transmitter or receiving antenna as described earlier herein with reference to FIGS. 6-10. In some embodiments, the example method 1800 can include filtering the received signal to limit the bandwidth of the received signal to correspond to a frequency of interest. The example method 1800 can further include selecting the sampling frequency and the sampling duration to provide undersampling at a rate below a Nyquist rate associated with a frequency of interest. In embodiments, the sampling frequency $f_s$ can be any frequency below the Nyquist rate associated with the frequency of interest, and at least double the bandwidth of a filtered frequency band corresponding to the frequency of interest. In embodiments, the frequency of interest is a nominal operating frequency of the downhole tool 219.

In embodiments, the example method 1800 can include performing a mixing operation using components and methods as described earlier herein with reference to FIG. 13, on the received signal to generate a converted signal on which sampling operations are performed. The mixing operation can be performed using a VCO, although embodiments are not limited thereto, and the converted signal can be filtered with a RBW filter as described earlier herein with reference to FIG. 13, wherein the low pass filtering 1314 can be replaced by an RBW bandpass filter to generate a narrowband signal. The example method 1800 can include frequency sweeping, using the VCO and as described earlier herein with reference to Equation (6), to generate a frequency domain representation of the channel. The example method 1800 can further include digital conversion using a digital RBW to create a swept-tuned spectrum analyzer as illustrated in FIG. 15.

In embodiments, the processor 312 can implement PSD estimation to detect erratic noise and interference sources. In this regard, a number of blocks can be selected as described earlier herein with respect to operation (7) and FIG. 17.

The example method 1800 continues with operation 1804 with detecting a frequency of a component of the sampled signal from inspection of a frequency domain representation of the sampled signal. In embodiments, detecting the frequency can comprise calculating a Fourier transform of the sampled signal to provide the frequency domain representation of the sampled signal. In embodiments, the processor 312 can implement FFT algorithms, DFT algorithms, or can construct the frequency spectrum directly if a swept-tuned spectrum analyzer was implementation was used, etc., to generate the frequency domain representation of the sampled signal. In embodiments, the processor 312 can also detect severity of the noise component. In embodiments including PSD estimation to detect erratic noise/interference sources, the processor 312 can perform operations such as squaring of results as described earlier herein with respect to FIG. 17 to obtain PSD and average blocks.

The example method 1800 continues with operation 1806 with adjusting at least one operating frequency for the downhole tool 219 such that the at least one operating frequency is outside a frequency range from the frequency of the component (e.g., the noise component or interference component). For example, the processor 312 may adjust operating frequencies to avoid peaks illustrated in FIG. 5 as described earlier herein. In example embodiments, the processor 312 can adjust operating frequency based on both the frequency and the severity of the noise/interference component. In embodiments, the processor 312 adjusts output power of the downhole tool 219 based on the severity of the noise/interference component. The example method 1800 can then include performing a logging or drilling operation using the downhole tool 219 and using the at least one operating frequency that may or may not have been adjusted using the above-described method.

Figure 19:
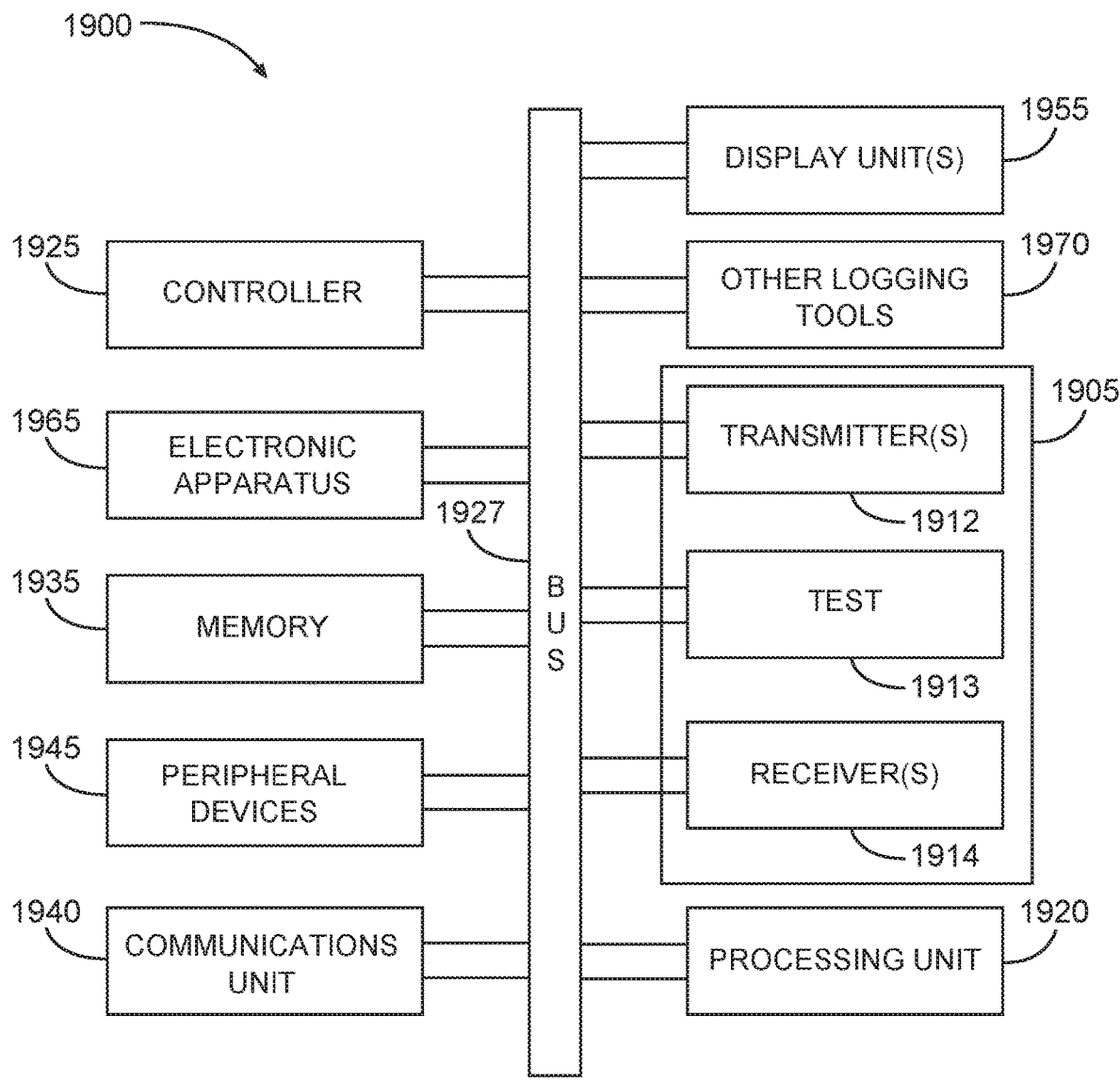
FIG. 19 is a block diagram of a logging system according to various embodiments.

FIG. 19 depicts a block diagram of features of a logging system 1900 in accordance with various embodiments. Referring now to FIGS. 1, 2 and 19, it can be seen that the logging system 1900 can receive measurement data from the resistivity measurement tool 120 or the downhole tool 219. The system 900 includes a resistivity tool 1905 having an arrangement of transmitter antenna(s) 1912 and receiver antenna(s) 1914 operable in a wellbore. A separate test antenna 1913 can be included for detecting noise and interference frequencies as described earlier herein, and the separate test antenna can include the same or similar components as shown in one or more of FIG. 3, 6, 8, 10, 13 or 15, although in some embodiments the transmitter antenna(s) 1912 and receiver antenna(s) 1914 can operate to perform functionalities of the test antenna 1913. The resistivity tool 1905 and/or the separate modules of the resistivity tool 1905 (e.g., the transmitter(s) 1912, test antenna 1913, receiver(s) 1914, etc., can also include specialized processors, memory, controller, etc., which are not shown in FIG. 19 to carry out specialized instructions received on the bus 1927.

The arrangements of the transmitter antenna(s) 1912 and the receiver antenna(s) 1914 of the resistivity tool 1905 can be realized similar to or identical to the various arrangements discussed herein. The resistivity tool 1905 can propagate energy at a plurality of frequencies into a formation. The resistivity tool 1905 can provide a plurality of measurements of a formation parameter responsive to the propagated energy.

The processing unit 1920 can couple to the resistivity tool 1905 to obtain measurements from the resistivity tool 1905. The processing unit 1920 can perform some or all of the operations of processor 312 (FIG. 3), including operations to detect noise or interference frequencies, generate frequency spectra, etc., as was described earlier herein with reference to FIGS. 3-18, in addition to other operations such as operations for providing display data, control data, communications data, etc., or for communicating with memory 1935.

The logging system 1900 can include a controller 1925, other electronic apparatus 1965, and a communications unit 1940. The controller 1925 and the processing unit 1920 can be fabricated to operate the resistivity tool 1905 to acquire measurement data, such as signals corresponding to formation resistivity measurements.

Electronic apparatus 1965 (e.g., electromagnetic sensors, etc.) and other logging tools 1970 (e.g., additional LWD tools, MWD tools, etc.) can be used in conjunction with the controller 1925 to perform tasks associated with taking measurements downhole. The communications unit 1940 can include downhole communications in a wireline or drilling operation. Such downhole communications can include a telemetry tool.

The logging system 1900 can also include a bus 1927 to provide common electrical signal paths between the components of the logging system 1900, primarily power and communications. The bus 1927 can also include an address bus, a data bus, and a control bus, each independently configured. The bus 1927 can also use common conductive lines for providing one or more of power distribution, communications between the different tools/modules, address, data, or control, the use of which can be regulated by the controller 1925.

The bus 1927 can include instrumentality for a communication network. The bus 1927 can be configured such that the components of the logging system 1900 are distributed. Such distribution can be arranged between downhole components and components that can be disposed on the surface of a well. Alternatively, several of these components can be co-located such as on one or more collars of a drill string or on a wireline structure.

In various embodiments, the logging system 1900 can communicate with some uphole or surface systems such as peripheral devices that can include displays 1955, additional storage memory, or other controlled devices that may operate in conjunction with the controller 1925 or the processing unit 1920. The display 1955 can display diagnostic information for the resistivity tool 1905 or other downhole tools 219 based on the signals generated according to embodiments described above.

In an embodiment, the controller 1925 and memory 1935 can be fabricated to include one or more processors. The display 1955 can be fabricated or programmed to operate with instructions stored in the processing unit 1920 (for example in the memory 1935) to implement a user interface to manage the operation methods described earlier herein. This type of user interface can be operated in conjunction with the communications unit 1940 and the bus 1927. Various components of the logging system 1900 can be integrated with the downhole tool 219 or associated housing such that processing identical to or similar to the methods discussed with respect to various embodiments herein can be performed downhole.

In various embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory 1935 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 1920. Operating on these physical structures can cause the machine to perform operations according to methods described herein. The instructions can include instructions to cause the processing unit 1920 to sample, or work with other components of FIG. 3, 13, or 15 to sample, a received signal that represents downhole noise/interference. The instructions can cause the processing unit 1920 to select a sampling frequency and for a sampling duration, for the sampling. The instructions can cause the processing unit 1920 to detect a frequency of a noise/interference component of the sampled signal from inspection of a frequency domain representation of the sampled signal, and to generate the frequency domain representation according to methods described earlier herein. The instructions can cause the processing unit 1920, or other components of the system 1900, to adjusting at least one operating frequency for the downhole tool such that the at least one operating frequency is outside a frequency range from the frequency of the noise/interference component, among other functionalities.

Any of the above components, may all be characterized as "modules" herein. Such modules may include hardware circuitry, and/or a processor and/or memory circuits, software program modules and objects, and/or firmware, and combinations thereof, as desired by the architect of the downhole tool 219, resistivity measurement tool 120, and systems 100, 200, and 1900 as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations herein are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules.

It should be noted that various activities described with respect to the methods identified herein can be executed in iterative, serial, or parallel fashion. Activities in one method may be substituted for those of another method. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C #. In another example, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

In summary, using the apparatus, systems, and methods disclosed herein may analyze a frequency spectrum downhole, and in real-time, to detect noise and interference sources and to adjust operating frequencies of downhole tools to avoid frequencies in which noise and interference are present. This process can reduce power consumption of downhole tools while improving accuracy of downhole tools that are sensitive to noise/interference in various frequency ranges.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Various examples include:

Example 1 is a method for adjusting a downhole tool, the method comprising: sampling a received signal that represents a downhole signal source, at a sampling frequency and for a sampling duration, to provide a sampled signal; detecting a frequency of a component of the sampled signal from inspection of a frequency domain representation of the sampled signal; and adjusting at least one operating frequency for the downhole tool such that the at least one operating frequency is outside a frequency range from the frequency of the component of the sampled signal.

In Example 2, the subject matter of Example 1 further optionally includes wherein the downhole signal source includes one of a noise source and an interference source.

In Example 3, the subject matter of any of Examples 1-2 can further optionally include detecting severity of the component, wherein the at least one operating frequency is adjusted based on both the frequency and the severity of the component, and wherein the method further comprises adjusting output power of the downhole tool based on the severity of the component.

In Example 4, the subject matter of any of Examples 1-3 can further optionally include filtering the received signal to limit a bandwidth of the received signal to correspond to a frequency of interest; and selecting the sampling frequency and the sampling duration to provide undersampling at a rate below a Nyquist rate associated with a frequency of interest.

In Example 5, the subject matter of Example 4 can optionally include wherein the sampling frequency is below the Nyquist rate associated with the frequency of interest, and wherein the sampling frequency is at least double a bandwidth of a filtered frequency band corresponding to the frequency of interest.

In Example 6, the subject matter of Example 5 can further optionally include wherein the frequency of interest is a nominal operating frequency of the downhole tool.

In Example 7, the subject matter of any of Examples 1-6 can further optionally include wherein the downhole tool includes a resistivity tool, and wherein the method further comprises: adjusting at least one of an operating frequency and output power of the resistivity tool prior to each measurement using the resistivity tool.

In Example 8, the subject matter of any of Examples 2-7 can further optionally include performing a mixing operation and low pass filtering operation on the received signal to generate a converted signal; and providing the converted signal for the sampling.

In Example 9, the subject matter of Example 8 can further optionally include wherein the mixing operation is performed using a voltage controlled oscillator (VCO), and wherein detecting the frequency of the component comprises: filtering the converted signal with a resolution bandwidth (RBW) filter to generate a narrowband signal; and frequency sweeping, using the VCO, to generate a frequency domain representation of the received signal.

In Example 10, the subject matter of any of Examples 1-9 can further optionally include wherein the downhole tool includes a telemetry system, and wherein the method includes adjusting the at least one operating frequency to provide channel probing for the telemetry system.

In Example 11, the subject matter of any of Examples 1-10 can further optionally include wherein the component includes a vibrational noise.

In Example 12, the subject matter of any of Examples 1-11 can further optionally include wherein detecting the frequency of the component comprises calculating a Fourier transform of the sampled signal to provide the frequency domain representation of the sampled signal.

In Example 13, the subject matter of any of Examples 1-12 can further optionally include performing a logging or drilling operation using the downhole tool using the at least one operating frequency.

Example 14 is an apparatus comprising: an antenna assembly including an antenna winding for receiving a downhole signal, wherein the downhole signal represents one of noise or interference; an analog-to-digital converter (ADC) coupled to the antenna assembly and configured to convert the signal to a sampled signal; and one or more processors to detect a frequency and severity of a component of the sampled signal from inspection of a frequency domain representation of the sampled signal.

In Example 15, the subject matter of Example 14 can optionally include a super-heterodyne system, coupled to the antenna and to the ADC, configured to use frequency mixing and low-pass filtering to convert the signal, having a first frequency, to a converted signal having a second frequency, lower than the first frequency; and provide the converted signal to the ADC.

In Example 16, the subject matter of any of Examples 14-15 can optionally include a bandpass filter configured to limit a bandwidth of the signal to correspond to a frequency of interest.

In Example 17, the subject matter of any of Examples 14-16 can optionally include wherein the one or more processors are configured to select a sampling frequency and a sampling duration to be used by the ADC to provide undersampling at a rate below a Nyquist rate associated with a frequency of interest.

In Example 18, the subject matter of any of Examples 14-17 can optionally include tuning assembly coupled to the antenna assembly, and wherein the one or more processors are further configured to provide control to the tuning assembly to adjust at least one operating frequency of the antenna assembly such that the at least one operating frequency is outside a threshold frequency-referenced distance from the frequency of the component.

In Example 19, the subject matter of Example 18 can optionally include wherein the tuning assembly includes a plurality of capacitive components arranged in parallel.

In Example 20, the subject matter of Example 18 can optionally include wherein the tuning assembly includes a plurality of capacitive components arranged in series.

Example 21 is a system comprising: a receiver including an antenna and processor to sample a received signal that represents a downhole signal, at a sampling frequency and for a sampling duration, to provide a sampled signal; detect a frequency and severity of a component of the sampled signal from inspection of a frequency domain representation of the sampled signal; and adjust at least one operating frequency for a downhole tool such that the at least one operating frequency is outside a threshold frequency-referenced distance from the frequency of the component; and the downhole tool for providing measurement data to a surface system.

In Example 22, the subject matter of Example 21 can optionally include wherein the receiver is housed within the downhole tool.

In Example 23, the subject matter of Example 21 can optionally include wherein the downhole tool includes a very deep resistivity (VDR) tool.

In Example 24, the subject matter of any of Examples 21-23 can optionally include wherein the downhole signal source includes at least one of a noise source and an interference source.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method for adjusting a downhole tool, the method comprising:
   operating the downhole tool that includes a transmitter and a receiver; and
   during operation of the downhole tool,
   sampling a signal received by the receiver, wherein the received signal is sampled at a sampling frequency and for a sampling duration to provide a sampled signal, wherein the sampling frequency is determined based on low pass or band pass filtering the received signal that limits a bandwidth of the received signal to a highest frequency or frequency band of interest;
   identifying a source within a frequency spectrum including detecting a frequency of a component of the sampled signal from inspection of a frequency domain representation of the sampled signal; and
   adjusting at least one operating frequency for the transmitter of the downhole tool such that the at least one operating frequency is outside a frequency range from the frequency of the component of the sampled signal.

2. The method of claim 1, wherein the component is generated by at least one of a noise source and an interference source.

3. The method of claim 1, further comprising:
   detecting severity of the component, wherein the at least one operating frequency is adjusted based on both a frequency and a severity of the component, and wherein the method further comprises adjusting output power of the downhole tool based on the severity of the component.

4. The method of claim 3, further comprising:
   filtering the received signal to limit a bandwidth of the received signal to correspond to a frequency of interest; and
   selecting the sampling frequency and the sampling duration to provide undersampling at a rate below a Nyquist rate associated with the frequency of interest.

5. The method of claim 4, wherein the sampling frequency is below the Nyquist rate associated with the frequency of interest, and wherein the sampling frequency is at least double a bandwidth of a filtered frequency band corresponding to the frequency of interest.

6. The method of claim 1,
   wherein the frequency of interest is a nominal operating frequency of the downhole measurement tool,
   wherein the downhole measurement tool is a resistivity tool, and
   wherein the method further comprises:
   adjusting at least one of an operating frequency and output power of the resistivity tool prior to one or more individual measurements using the resistivity tool.

7. The method of claim 1, further comprising:
   performing a mixing operation and low pass filtering operation on the received signal to generate a converted signal; and
   providing the converted signal for the sampling.

8. The method of claim 7, wherein the mixing operation is performed using a voltage controlled oscillator (VCO), and wherein detecting the frequency of the component comprises:
   filtering the converted signal with a resolution bandwidth (RBW) filter to generate a narrowband signal; and
   frequency sweeping, using the VCO, to generate a frequency domain representation of the received signal.

9. The method of claim 1, wherein the downhole measurement tool is operably coupled to a telemetry system, and wherein the method includes adjusting the at least one operating frequency to provide channel probing for the telemetry system.

10. The method of claim 1, wherein the component includes a vibrational noise.

11. The method of claim 1, wherein detecting the frequency of the component comprises:
calculating a Fourier transform of the sampled signal to provide the frequency domain representation of the sampled signal.

12. The method of claim 1, further comprising:
performing a logging or drilling operation using the downhole measurement tool using the adjusted at least one operating frequency.

13. A downhole tool comprising:
a transmitter to transmit signals; and
a receiver including,
an antenna assembly including an antenna winding to receive a downhole signal;
an analog-to-digital converter (ADC) coupled to the antenna assembly and configured to convert the signal to a sampled signal, wherein the ADC samples the received downhole signal at a sampling frequency and for a sampling duration to provide the sampled signal, wherein the sampling frequency is determined based on low pass or band pass filtering the received signal that limits a bandwidth of the received signal to a highest frequency or a frequency band of interest; and
one or more processors to,
identify a source within a frequency spectrum including detecting a frequency of a component of the sampled signal from inspection of a frequency domain representation of the sampled signal; and
adjust at least one operating frequency for the transmitter of the downhole tool such that the at least one operating frequency is outside a frequency range from the frequency of the component of the sampled signal.

14. The downhole tool of claim 13, further comprising:
a super-heterodyne system, coupled to the antenna and to the ADC, configured to
use frequency mixing and low-pass filtering to convert the signal, having a first frequency, to a converted signal having a second frequency, lower than the first frequency; and
provide the converted signal to the ADC.

15. The downhole tool of claim 13, wherein the one or more processors are configured to select a sampling frequency and a sampling duration to be used by the ADC to provide undersampling at a rate below a Nyquist rate associated with a frequency of interest.

16. The downhole tool of claim 13, further comprising:
a tuning assembly coupled to the antenna assembly, and wherein the one or more processors are further configured to provide control to the tuning assembly to adjust at least one operating frequency of the antenna assembly such that the at least one operating frequency is outside a threshold frequency-referenced distance from the frequency of the component.

17. The downhole tool of claim 16, wherein the tuning assembly includes a plurality of capacitive components arranged in parallel.

18. The downhole tool of claim 16, wherein the tuning assembly includes a plurality of capacitive components arranged in series.

19. The downhole tool of claim 13, wherein the component is generated by at least one of a noise source and an interference source.

* * * * *